(12) United States Patent
Harmelin et al.

(10) Patent No.: US 8,539,056 B2
(45) Date of Patent: Sep. 17, 2013

(54) SYSTEMS AND METHODS FOR CONFIGURING MULTIPLE NETWORK INTERFACES

(75) Inventors: Shai Harmelin, Seattle, WA (US); Nicholas Montgomery Kirsch, Seattle, WA (US); Qichu Lu, Bellevue, WA (US); Aaron Passey, Seattle, WA (US); Scott Van Woudenberg, Seattle, WA (US)

(73) Assignee: EMC Corporation, Hopkinton, MA (US)

( * ) Notice: Subject to any disclaimer, the term of this patent is extended or adjusted under 35 U.S.C. 154(b) by 1990 days.

(21) Appl. No.: 11/497,806

(22) Filed: Aug. 2, 2006

(65) Prior Publication Data
US 2008/0031238 A1    Feb. 7, 2008

(51) Int. Cl.
G06F 15/177    (2006.01)
G06F 15/173    (2006.01)

(52) U.S. Cl.
USPC ........... 709/223; 709/221; 709/224; 709/225; 709/226

(58) Field of Classification Search
USPC ....................................................... 709/223
See application file for complete search history.

(56) References Cited

U.S. PATENT DOCUMENTS

| | | |
|---|---|---|
| 5,163,131 A | 11/1992 | Row et al. |
| 5,181,162 A | 1/1993 | Smith et al. |
| 5,212,784 A | 5/1993 | Sparks |
| 5,230,047 A | 7/1993 | Frey et al. |
| 5,251,206 A | 10/1993 | Calvignac et al. |
| 5,258,984 A | 11/1993 | Menon et al. |
| 5,329,626 A | 7/1994 | Klein et al. |
| 5,359,594 A | 10/1994 | Gould et al. |
| 5,403,639 A | 4/1995 | Belsan et al. |
| 5,548,724 A | 8/1996 | Akizawa et al. |
| 5,568,629 A | 10/1996 | Gentry et al. |
| 5,596,709 A | 1/1997 | Bond et al. |
| 5,606,669 A | 2/1997 | Bertin et al. |
| 5,612,865 A | 3/1997 | Dasgupta |

(Continued)

FOREIGN PATENT DOCUMENTS

| | | |
|---|---|---|
| EP | 0774723 | 5/1997 |
| JP | 2006-506741 | 6/2004 |

(Continued)

OTHER PUBLICATIONS

IOS Commands, Feb. 6, 2005, Pantz.org, [online], <web.archive.org/web/20050206184604/http://pantz.org/os/ios/ioscommands.shtml>, pp. 1-12 as printed.*

(Continued)

Primary Examiner — April Y Blair
Assistant Examiner — Feliciano Mejia
(74) Attorney, Agent, or Firm — Knobbe, Martens, Olson & Bear, LLP

(57) ABSTRACT

In one embodiment, systems and methods are provided for configuring multiple network interfaces based on a network profile. In one embodiment, a user interface module manages the creation, modification, and deletion of active and inactive profiles, which may be stored to a configuration file accessible to computers with network interfaces belonging to the respective profiles, such as homogeneous or heterogeneous nodes in a clustered network of computers. In one embodiment, a configuration module reads a configuration file with embedded network profiles and builds the appropriate network interfaces according to the interface parameters specified in the network profiles.

23 Claims, 15 Drawing Sheets

(56) References Cited

U.S. PATENT DOCUMENTS

| | | |
|---|---|---|
| 5,649,200 A | 7/1997 | Leblang et al. |
| 5,657,439 A | 8/1997 | Jones et al. |
| 5,668,943 A | 9/1997 | Attanasio et al. |
| 5,680,621 A | 10/1997 | Korenshtein |
| 5,694,593 A | 12/1997 | Baclawski |
| 5,696,895 A | 12/1997 | Hemphill et al. |
| 5,734,826 A | 3/1998 | Olnowich et al. |
| 5,754,756 A | 5/1998 | Watanabe et al. |
| 5,761,659 A | 6/1998 | Bertoni |
| 5,774,643 A | 6/1998 | Lubbers et al. |
| 5,799,305 A | 8/1998 | Bortvedt et al. |
| 5,805,578 A | 9/1998 | Stirpe et al. |
| 5,805,900 A | 9/1998 | Fagen et al. |
| 5,806,065 A | 9/1998 | Lomet |
| 5,822,790 A | 10/1998 | Mehrotra |
| 5,862,312 A | 1/1999 | Mann |
| 5,870,563 A | 2/1999 | Roper et al. |
| 5,878,410 A | 3/1999 | Zbikowski et al. |
| 5,878,414 A | 3/1999 | Hsiao et al. |
| 5,884,046 A | 3/1999 | Antonov |
| 5,884,098 A | 3/1999 | Mason, Jr. |
| 5,884,303 A | 3/1999 | Brown |
| 5,890,147 A | 3/1999 | Peltonen et al. |
| 5,917,998 A | 6/1999 | Cabrera et al. |
| 5,933,834 A | 8/1999 | Aichelen |
| 5,943,690 A | 8/1999 | Dorricott et al. |
| 5,966,707 A | 10/1999 | Van Huben et al. |
| 5,996,089 A | 11/1999 | Mann |
| 6,014,669 A * | 1/2000 | Slaughter et al. ............... 707/10 |
| 6,021,414 A | 2/2000 | Fuller |
| 6,029,168 A | 2/2000 | Frey |
| 6,038,570 A | 3/2000 | Hitz et al. |
| 6,044,367 A | 3/2000 | Wolff |
| 6,052,759 A | 4/2000 | Stallmo et al. |
| 6,055,543 A | 4/2000 | Christensen et al. |
| 6,070,172 A | 5/2000 | Lowe |
| 6,081,833 A | 6/2000 | Okamoto et al. |
| 6,081,883 A | 6/2000 | Popelka et al. |
| 6,108,759 A | 8/2000 | Orcutt et al. |
| 6,117,181 A | 9/2000 | Dearth et al. |
| 6,122,754 A | 9/2000 | Litwin et al. |
| 6,138,126 A | 10/2000 | Hitz et al. |
| 6,154,854 A | 11/2000 | Stallmo |
| 6,173,374 B1 | 1/2001 | Heil et al. |
| 6,209,059 B1 | 3/2001 | Ofer et al. |
| 6,219,693 B1 | 4/2001 | Napolitano et al. |
| 6,321,345 B1 | 11/2001 | Mann |
| 6,334,168 B1 | 12/2001 | Islam et al. |
| 6,353,823 B1 | 3/2002 | Kumar |
| 6,384,626 B2 | 5/2002 | Tsai et al. |
| 6,385,626 B1 | 5/2002 | Tamer et al. |
| 6,393,483 B1 * | 5/2002 | Latif et al. ................... 709/226 |
| 6,397,311 B1 | 5/2002 | Capps |
| 6,405,219 B2 | 6/2002 | Saether et al. |
| 6,408,313 B1 | 6/2002 | Campbell et al. |
| 6,421,781 B1 | 7/2002 | Fox et al. |
| 6,434,574 B1 | 8/2002 | Day et al. |
| 6,449,730 B2 | 9/2002 | Mann |
| 6,453,389 B1 | 9/2002 | Weinberger et al. |
| 6,457,139 B1 | 9/2002 | D'Errico et al. |
| 6,463,442 B1 | 10/2002 | Bent et al. |
| 6,499,091 B1 | 12/2002 | Bergsten |
| 6,502,172 B2 | 12/2002 | Chang |
| 6,502,174 B1 | 12/2002 | Beardsley et al. |
| 6,523,130 B1 | 2/2003 | Hickman et al. |
| 6,526,478 B1 | 2/2003 | Kirby |
| 6,546,443 B1 | 4/2003 | Kakivaya et al. |
| 6,549,513 B1 | 4/2003 | Chao et al. |
| 6,557,114 B2 | 4/2003 | Mann |
| 6,567,894 B1 | 5/2003 | Hsu et al. |
| 6,567,926 B2 | 5/2003 | Mann |
| 6,571,244 B1 | 5/2003 | Larson |
| 6,571,349 B1 | 5/2003 | Mann |
| 6,574,745 B2 | 6/2003 | Mann |
| 6,594,655 B2 | 7/2003 | Tal et al. |
| 6,594,660 B1 | 7/2003 | Berkowitz et al. |
| 6,594,744 B1 | 7/2003 | Humlicek et al. |
| 6,598,174 B1 | 7/2003 | Parks et al. |
| 6,618,798 B1 | 9/2003 | Burton et al. |
| 6,662,184 B1 | 12/2003 | Friedberg |
| 6,671,686 B2 | 12/2003 | Pardon et al. |
| 6,671,704 B2 | 12/2003 | Gondi et al. |
| 6,687,805 B1 | 2/2004 | Cochran |
| 6,732,125 B1 | 5/2004 | Autrey et al. |
| 6,748,429 B1 * | 6/2004 | Talluri et al. ................... 709/221 |
| 6,801,949 B1 * | 10/2004 | Bruck et al. ................... 709/232 |
| 6,848,029 B2 | 1/2005 | Coldewey |
| 6,856,591 B1 * | 2/2005 | Ma et al. ........................ 370/216 |
| 6,895,534 B2 * | 5/2005 | Wong et al. ...................... 714/55 |
| 6,907,011 B1 | 6/2005 | Miller et al. |
| 6,917,942 B1 | 7/2005 | Burns et al. |
| 6,922,696 B1 | 7/2005 | Lincoln et al. |
| 6,934,878 B2 | 8/2005 | Massa et al. |
| 6,940,966 B2 | 9/2005 | Lee |
| 6,954,435 B2 | 10/2005 | Billhartz et al. |
| 6,990,604 B2 | 1/2006 | Binger |
| 6,990,611 B2 | 1/2006 | Busser |
| 7,007,044 B1 | 2/2006 | Rafert et al. |
| 7,007,097 B1 | 2/2006 | Huffman et al. |
| 7,017,003 B2 | 3/2006 | Murotani et al. |
| 7,043,485 B2 | 5/2006 | Manley et al. |
| 7,069,320 B1 | 6/2006 | Chang et al. |
| 7,111,305 B2 | 9/2006 | Solter et al. |
| 7,124,264 B2 | 10/2006 | Yamashita |
| 7,146,524 B2 | 12/2006 | Patel et al. |
| 7,152,182 B2 | 12/2006 | Ji et al. |
| 7,177,295 B1 | 2/2007 | Sholander et al. |
| 7,184,421 B1 | 2/2007 | Liu et al. |
| 7,194,487 B1 | 3/2007 | Kekre et al. |
| 7,225,204 B2 | 5/2007 | Manley et al. |
| 7,228,299 B1 | 6/2007 | Harmer et al. |
| 7,240,235 B2 | 7/2007 | Lewalski-Brechter |
| 7,249,118 B2 | 7/2007 | Sandler et al. |
| 7,257,257 B2 | 8/2007 | Anderson et al. |
| 7,313,614 B2 * | 12/2007 | Considine et al. ............ 709/223 |
| 7,318,134 B1 | 1/2008 | Oliveira et al. |
| 7,373,426 B2 | 5/2008 | Jinmei et al. |
| 7,386,697 B1 | 6/2008 | Case et al. |
| 7,440,966 B2 | 10/2008 | Adkins et al. |
| 7,451,341 B2 | 11/2008 | Okaki et al. |
| 7,509,448 B2 | 3/2009 | Fachan et al. |
| 7,533,298 B2 | 5/2009 | Smith et al. |
| 7,546,354 B1 | 6/2009 | Fan et al. |
| 7,546,412 B2 | 6/2009 | Ahmad et al. |
| 7,571,348 B2 | 8/2009 | Deguchi et al. |
| 7,680,836 B2 | 3/2010 | Anderson et al. |
| 7,680,842 B2 | 3/2010 | Anderson et al. |
| 2001/0042224 A1 | 11/2001 | Stanfill et al. |
| 2001/0047451 A1 | 11/2001 | Noble et al. |
| 2001/0056492 A1 | 12/2001 | Bressoud et al. |
| 2002/0010696 A1 | 1/2002 | Izumi |
| 2002/0035668 A1 | 3/2002 | Nakano et al. |
| 2002/0038436 A1 | 3/2002 | Suzuki |
| 2002/0055940 A1 | 5/2002 | Elkan |
| 2002/0072974 A1 | 6/2002 | Pugliese et al. |
| 2002/0075870 A1 | 6/2002 | de Azevedo et al. |
| 2002/0078180 A1 | 6/2002 | Miyazawa |
| 2002/0083078 A1 | 6/2002 | Pardon et al. |
| 2002/0083118 A1 | 6/2002 | Sim |
| 2002/0087366 A1 | 7/2002 | Collier et al. |
| 2002/0095438 A1 | 7/2002 | Rising et al. |
| 2002/0124137 A1 | 9/2002 | Ulrich et al. |
| 2002/0138559 A1 | 9/2002 | Ulrich et al. |
| 2002/0156840 A1 | 10/2002 | Ulrich et al. |
| 2002/0156891 A1 | 10/2002 | Ulrich et al. |
| 2002/0156973 A1 | 10/2002 | Ulrich et al. |
| 2002/0156974 A1 | 10/2002 | Ulrich et al. |
| 2002/0156975 A1 | 10/2002 | Staub et al. |
| 2002/0158900 A1 * | 10/2002 | Hsieh et al. ................... 345/738 |
| 2002/0161846 A1 | 10/2002 | Ulrich et al. |
| 2002/0161850 A1 | 10/2002 | Ulrich et al. |
| 2002/0161973 A1 | 10/2002 | Ulrich et al. |
| 2002/0163889 A1 | 11/2002 | Yemini et al. |
| 2002/0165942 A1 | 11/2002 | Ulrich et al. |

| | | |
|---|---|---|
| 2002/0166026 A1 | 11/2002 | Ulrich et al. |
| 2002/0166079 A1 | 11/2002 | Ulrich et al. |
| 2002/0169827 A1 | 11/2002 | Ulrich et al. |
| 2002/0174295 A1 | 11/2002 | Ulrich et al. |
| 2002/0174296 A1 | 11/2002 | Ulrich et al. |
| 2002/0178162 A1 | 11/2002 | Ulrich et al. |
| 2002/0191311 A1 | 12/2002 | Ulrich et al. |
| 2002/0194523 A1 | 12/2002 | Ulrich et al. |
| 2002/0194526 A1 | 12/2002 | Ulrich et al. |
| 2002/0198864 A1 | 12/2002 | Ostermann et al. |
| 2003/0005159 A1 | 1/2003 | Kumhyr |
| 2003/0014391 A1 | 1/2003 | Evans et al. |
| 2003/0033308 A1 | 2/2003 | Patel et al. |
| 2003/0061491 A1 | 3/2003 | Jaskiewicz et al. |
| 2003/0109253 A1 | 6/2003 | Fenton et al. |
| 2003/0120863 A1 | 6/2003 | Lee et al. |
| 2003/0125852 A1 | 7/2003 | Schade et al. |
| 2003/0131860 A1 | 7/2003 | Ashcraft et al. |
| 2003/0135514 A1 | 7/2003 | Patel et al. |
| 2003/0149750 A1 | 8/2003 | Franzenburg |
| 2003/0158873 A1 | 8/2003 | Sawdon et al. |
| 2003/0163726 A1 | 8/2003 | Kidd |
| 2003/0172149 A1 | 9/2003 | Edsall et al. |
| 2003/0177308 A1 | 9/2003 | Lewalski-Brechter |
| 2003/0182325 A1 | 9/2003 | Manely et al. |
| 2004/0003053 A1 | 1/2004 | Williams |
| 2004/0024731 A1 | 2/2004 | Cabrera et al. |
| 2004/0024963 A1 | 2/2004 | Talagala et al. |
| 2004/0078812 A1 | 4/2004 | Calvert |
| 2004/0133670 A1 | 7/2004 | Kaminsky et al. |
| 2004/0143647 A1 | 7/2004 | Cherkasova |
| 2004/0153479 A1 | 8/2004 | Mikesell et al. |
| 2004/0189682 A1 | 9/2004 | Troyansky et al. |
| 2004/0199734 A1 | 10/2004 | Rajamani et al. |
| 2004/0199812 A1 | 10/2004 | Earl et al. |
| 2004/0205141 A1 | 10/2004 | Goland |
| 2004/0230748 A1 | 11/2004 | Ohba |
| 2004/0260673 A1 | 12/2004 | Hitz et al. |
| 2005/0010592 A1 | 1/2005 | Guthrie |
| 2005/0066095 A1 | 3/2005 | Mullick et al. |
| 2005/0114402 A1 | 5/2005 | Guthrie |
| 2005/0114609 A1 | 5/2005 | Shorb |
| 2005/0131860 A1 | 6/2005 | Livshits |
| 2005/0131990 A1 | 6/2005 | Jewell |
| 2005/0138195 A1 | 6/2005 | Bono |
| 2005/0171960 A1 | 8/2005 | Lomet |
| 2005/0171962 A1 | 8/2005 | Martin et al. |
| 2005/0187889 A1 | 8/2005 | Yasoshima |
| 2005/0188052 A1 | 8/2005 | Ewanchuk et al. |
| 2005/0192993 A1* | 9/2005 | Messinger .................. 707/101 |
| 2005/0289169 A1 | 12/2005 | Adya et al. |
| 2005/0289188 A1 | 12/2005 | Nettleton et al. |
| 2006/0004760 A1 | 1/2006 | Clift et al. |
| 2006/0041894 A1 | 2/2006 | Cheng |
| 2006/0047925 A1 | 3/2006 | Perry |
| 2006/0059467 A1 | 3/2006 | Wong |
| 2006/0074922 A1 | 4/2006 | Nishimura |
| 2006/0083177 A1 | 4/2006 | Iyer et al. |
| 2006/0095438 A1 | 5/2006 | Fachan et al. |
| 2006/0101062 A1 | 5/2006 | Godman et al. |
| 2006/0129584 A1 | 6/2006 | Hoang et al. |
| 2006/0129631 A1 | 6/2006 | Na et al. |
| 2006/0129983 A1 | 6/2006 | Feng |
| 2006/0155831 A1 | 7/2006 | Chandrasekaran |
| 2006/0206536 A1 | 9/2006 | Sawdon et al. |
| 2006/0230411 A1 | 10/2006 | Richter et al. |
| 2006/0277432 A1 | 12/2006 | Patel |
| 2006/0288161 A1 | 12/2006 | Cavallo |
| 2007/0091790 A1 | 4/2007 | Passey et al. |
| 2007/0094269 A1 | 4/2007 | Mikesell et al. |
| 2007/0094277 A1 | 4/2007 | Fachan et al. |
| 2007/0094310 A1 | 4/2007 | Passey et al. |
| 2007/0094431 A1 | 4/2007 | Fachan |
| 2007/0094452 A1 | 4/2007 | Fachan |
| 2007/0168351 A1 | 7/2007 | Fachan |
| 2007/0171919 A1 | 7/2007 | Godman et al. |
| 2007/0195810 A1 | 8/2007 | Fachan |
| 2007/0233684 A1 | 10/2007 | Verma et al. |
| 2007/0233710 A1 | 10/2007 | Passey et al. |
| 2007/0255765 A1 | 11/2007 | Robinson |
| 2008/0005145 A1 | 1/2008 | Worrall |
| 2008/0010507 A1 | 1/2008 | Vingralek |
| 2008/0021907 A1 | 1/2008 | Patel et al. |
| 2008/0031238 A1 | 2/2008 | Harmelin et al. |
| 2008/0034004 A1 | 2/2008 | Cisler et al. |
| 2008/0044016 A1 | 2/2008 | Henzinger |
| 2008/0046432 A1 | 2/2008 | Anderson et al. |
| 2008/0046443 A1 | 2/2008 | Fachan et al. |
| 2008/0046444 A1 | 2/2008 | Fachan et al. |
| 2008/0046445 A1 | 2/2008 | Passey et al. |
| 2008/0046475 A1 | 2/2008 | Anderson et al. |
| 2008/0046476 A1 | 2/2008 | Anderson et al. |
| 2008/0046667 A1 | 2/2008 | Fachan et al. |
| 2008/0059541 A1 | 3/2008 | Fachan et al. |
| 2008/0126365 A1 | 5/2008 | Fachan et al. |
| 2008/0154978 A1 | 6/2008 | Lemar et al. |
| 2008/0168458 A1 | 7/2008 | Fachan et al. |
| 2008/0256103 A1 | 10/2008 | Fachan et al. |
| 2008/0256545 A1 | 10/2008 | Fachan et al. |
| 2008/0294611 A1 | 11/2008 | Anglin et al. |
| 2009/0210880 A1 | 8/2009 | Fachan et al. |

FOREIGN PATENT DOCUMENTS

| | | |
|---|---|---|
| WO | WO 94/29796 | 12/1994 |
| WO | WO 00/57315 | 9/2000 |
| WO | WO 01/14991 | 3/2001 |
| WO | WO 01/33829 | 5/2001 |
| WO | WO 02/061737 | 8/2002 |
| WO | WO 03/012699 | 2/2003 |
| WO | WO 2004/046971 | 6/2004 |
| WO | WO 2008/021527 | 2/2008 |
| WO | WO 2008/021528 | 2/2008 |

OTHER PUBLICATIONS

IP forwarding with Cisco routers, Jun. 15, 1999, [online], <ws.edu.isoc.org/data/1999/1481713642400af6a2de56a/ip_fwd_cisco_config.ppt>, pp. 1-11 as printed.*
Feb. 22, 2008 Int'l Search report PCT/US07/018326, 20 pages.
May 8, 2008 Int'l Search report PCT/US07/018324, 13 pages.
Kumar Akhil, "An analysis of borrowing policies for escrow transactions in a replicated data environment", Institute of Electrical and Electronics Engineers; Proceedings of the International Conference on Data Engineering, Los Angeles, Feb. 5-9, 1990; Los Alamitos, IEEE, Comp. Soc. Press, US. vol. Conf. 6, Feb. 5, 1990, pp. 446-454, XP010018185 ISBN: 978-0-8186-2025-6 p. 446, left-hand column, line 1—p. 447, last line.
Steven M. Bauer, Letter to Steve Goldman, Jul. 31, 2006 (including the first page of the patents), 8 pages.
Arthur S. Rose, Letter to Steven M. Bauer, Aug. 7, 2006, 2 pages.
Steven M. Bauer, Letter to Arthur S. Rose, Sep. 25, 2006, 2 pages.
Steven M. Bauer, Letter to Arthur S. Rose, Oct. 31, 2006, 1 page.
Arthur S. Rose, Letter to Steven M. Bauer, Nov. 9, 2006, 2 pages.
Steven M. Bauer, Letter to Arthur S. Rose, Feb. 6, 2007, 2 pages.
Arthur S. Rose, Letter to Steven M. Bauer, Feb. 23, 2007, 1 page.
Steven M. Bauer, Letter to Arthur S. Rose, Jun. 6, 2007 (including claim chart), 28 pages.
Arthur S. Rose, Letter to Steven M. Bauer, Jun. 22, 2007, 1 page.
Todd A. Gerety, Letter to Arthur S. Rose, Jun. 26, 2007, 1 page.
Isilon Systems, "Isilon IQ Plateform Overview", 4 pages, 2007 (Exhibit A).
Isilon Systems, "Uncompromising Reliability through Clustered Storage", Sep. 2006, 10 pages. (Exhibit B).
Byteandswitch, "Discovery Chooses Isilon," Apr. 23, 2007, 1 page (Exhibit C).
Taneja Group Technology Analysts, "The Power of InfiniBand and Clustered Storage", Dec. 2005, 8 pages (Exhibit E).
Arthur S. Rose, Letter to Steven M. Bauer, Aug. 31, 2007, 4 pages.
Ramez Elmasri, Fundamentals of Database Systems 3rd ed, Sep. 30, 1999, Addison-Wesley, pp. 155, 169, 171, 172, 173, 178, 181, 182, 381, 771.
MCSA/MSCE/MCDBA Self Paced Training Kit: MS SQL Server 2000 System Administration, May 14, 2003, Microsoft Press, Second Edition, 12 pages.

Supp EPO Search Report, App. No. EP 03 78 3599; dated Apr. 29, 2008, 2 pages.
Levy E., Ed.—Institute of Electrical and Electronics Engineers: "Incremental restart (database management)" Proc. Int. Conf. Data Eng., Kobe, JP, Apr. 8-12, 1991; IEEE Comp. Soc. Press, U.S., vol. Conf. 7, Apr. 8, 1991, pp. 640-648.
Haerder T et al: "Principles of Transaction-Oriented Database Recovery" ACM Computing Surveys, ACM, New York, NY, US, vol. 15, No. 4, Dec. 1, 1983, pp. 287-317.
Gray J et al: "Transaction processing: concepts and techniques (excerpt), Passage" Transaction Processing: Concepts and Techniques, Jan. 1, 1993, pp. 373-445.
Garcia-Molina H et al: "Database System Implementation, passage" Database System Implementation, Jan. 1, 2000, pp. I-V, 423-509.
Wedde H. F., et al.: "A universal framework for managing metadata in the distributed Dragon Slayer System", Proceedings of the Euromicro Conference. Euromicro. Informatics: Inventing the Future, Proceedings of Euromicro Workshop on Multimedia and Telecommunications, vol. 2, Sep. 5, 2000, pp. 96-101.
Tanenbaum, Andrew S., MINIX Operating System, Japan, Apr. 21, 1989, 1st Edition, pp. 328, 505; Also attached is what Applicant believes is the English language version: Tanenbaum, Andrew S., Operating Systems: Design and Implementation, Prentice-Hall, 1987, pp. 279, 347, 348.
Yamashita, Hirofumi, et al., "Development of RAID Filesystem VAFS/HR," The Special Interest Group Notes of IPSJ, Japan, Information Processing Society of Japan, Sep. 16, 1994, vol. 94, No. 80, p. 9-16.
Nov. 15, 2002 International Search Report PCT/US02/24728.
Apr. 20, 2004 International Search Report PCT/US03/36699.
Aug. 6, 2004 International Search Report PCT/US03/33704.
European Search Report dated May 21, 2007 issued to EP application No. 02756944.1-2201.
Philip A. Bernstein, Vassos Hadzilacos, and Nathan Goodman, *Concurrency Control and Recovery in Database Systems*, Addison-Wesley, 1987.
Birk, Y., *Deterministic load-balancing schemes for disk-based video-on-demand storage servers*, Mass Storage Systems 1995; Storage—At the Forefront of Information Infrastructures', Proceedings of the Fourteenth IEEE Symposium on Monterey, CA, Sep. 11-14, 1995, pp. 17-25.
Kenneth P. Birman, *Building Secure and Reliable Network Applications*, Manning, 1996, pp. 1-327.
Kenneth P. Birman, *Building Secure and Reliable Network Applications*, Manning, 1996, pp. 328-619.
Coulouris et al., *Distributed Systems Concepts and Design*; Addison-Wesley, Second Edition, 1994, pp. 353-371 and 377-405.
Jim Gray and Andreas Reuter, *Transaction Processing: Concepts and Techniques*, Morgan Kaufmann, 1993, pp. 1-328.
Jim Gray and Andreas Reuter, *Transaction Processing: Concepts and Techniques*, Morgan Kaufmann, 1993, pp. 329-664.
Jim Gray and Andreas Reuter, *Transaction Processing: Concepts and Techniques*, Morgan Kaufmann, 1993, pp. 665-1105.
Nancy A. Lynch, *Distributed Algorithms*, Morgan Kaufmann, 1996, pp. 1-409.
Nancy A. Lynch, *Distributed Algorithms*, Morgan Kaufmann, 1996 pp. 410-871.
Sape Mullender, editor, Distributed Systems ($2^{nd}$ Ed.), ACM Press/Addison-Wesley Publishing Co., New York, NY, USA, 1993, pp. 1-327.
Sape Mullender, editor, Distributed Systems ($2^{nd}$ Ed.), ACM Press/Addison-Wesley Publishing Co., New York, NY, USA, 1993, pp. 328-604.
Gibson, Garth A. et al., *The Scotch Parallel Storage System*, IEEE, 1995, pp. 403-410.
Gerhard Weikum, et al., *Transactional Information Systems: Theory, Algorithms, and the Practice of Concurrency Control and Recovery*, Morgan Kaufmann, 2002, pp. 1-450.
Gerhard Weikum, et al., *Transactional Information Systems: Theory, Algorithms, and the Practice of Concurrency Control and Recovery*, Morgan Kaufmann, 2002, pp. 451-863.
Sanjay Ghemawat et al., *The Google File System, Symposium on Operating Systems Principles*, Oct. 19-22, 2003, 15 pages, Bolton Landing, NY.
Pei Cao et al., The TickerTAIP parallel RAID architecture, 1993, 12 pages, Princeton, NJ.
Pei Cao et al., The TickerTAIP parallel RAID architecture, ACM Transactions on Computer Systems, vol. 12, No. 3, Aug. 1994, 34 pages, Palto Alto, California.
Bob Duzett, et al., *An Overview of the nCube 3 Supercomputer*, IEEE, Jul. 1992, pp. 458-464.
John Henry Hartman, *The Zebra Striped Network File System*, (Sc.B. (Brown University) 1987, pp. 1-148.
Darrell D.E, Long et al., *Swift/RAID: A Distributed Raid System*, Computing Systems, vol. 7, No. 3 Summer 1994, pp. 333-359.
Michael Stonebraker et al., *Distributed Raid: A new Multiple copy Algorithm*, IEEE 1990, pp. 430-434, Berkeley, California.
Stallings, William, *Operating Systems*, Prentice Hall, Fourth Edition; 2001, pp. 197-253 and 265-293.
United States Court of Appeals, Federal Circuit, *Seachange International, Inc.* vs. *nCUBE, Corp.*, Oct. 26, 2004, 28 pages.
United States Court of Appeals, Federal Circuit, *Seachange International, Inc.* vs. *C-Corp, Inc.*, Jun. 29, 2005, 22 pages.
United States District Court, Delaware, *Seachange International, Inc.* vs. *nCUBE, Corp.*, Apr. 7, 2004, 13 pages.
United States District Court, Delaware, *Seachange International, Inc.* vs. *nCUBE, Corp.*, Aug. 29, 2000, 12 pages.
May 18, 2009 Int'l Search report PCT/US08/059798, 18 pages.
Oct. 22, 2009 Int'l Preliminary Report on Patentability PCT/US08/059798, 10 pages.
Keidar, et al.: Increasing the Resilience of Distributed and Replicated Database Systems (1998) pp. 1-25.
Lougher P. et al., "Scalable storage servers for digital audio and video," International Conference on Storage and Recording Systems, 1994, Keele, UK, Jan. 1, 1994, pp. 140-143.
Reddy, P. Krishna et al., Reducing the blocking in two phase commit with backup sites Apr. 15, 2003, Elsevier, pp. 39-47.
Hisyuki Aoki, Parallel Filesystem MFS, IPSJ SIG Technical Reports, Japan, Information Processing Society of Japan, Aug. 26, 1996, vol. 96, No. 79, pp. 31 to 36.
Yoshitake Shinkai, Cluster File System: HAMFS, FUJITSU, Japan, Fujitsu Limited, Jul. 9, 1999, vol. 50, No. 4, pp. 210 to 214.
Hirofumi Yamashita, Development of RAID Filesystem FAFS/HR, IPSJ SIG Technical Reports, Japan, Information Processing Society of Japan, Sep. 16, 1994, vol. 94, No. 80, pp. 9 to 16.
Oct. 8, 2008 European Supplemental Search Report EP 02 75 6944, 6 pages.
Jan. 23, 2009 Examination Report EP 02 75 6944, 5 pages.

* cited by examiner

| 202 — | ext - LEGAL |
|---|---|
| 203 — | External Interface for Legal |
| 204 — Interface | External 1 |
| 206 — Subnet Mask | 255.255.0.0 |
| 208 — MTU | 1500 |
| 210 — IP Ranges | 10.7.6.55 - .60 |
| 212 — Gateway | 10.7.0.1 |
| 214 — DNS Server | 10.8.0.3 |
| 216 — Failover DNS | 10.8.0.4 |
| 218 — DNS Domain | legal.company.com |
| 220 — Profile Scope | none |
| 222 — Member Nodes | 5  10.7.6.55 |
|  | 6  10.7.6.56 |
|  | 7  10.7.6.57 |
|  | 8  10.7.6.58 |
|  | 9  10.7.6.59 |
|  | 10 10.7.6.60 |

| 202 — | ext - HR |
|---|---|
| 203 — | External Interface for Human Resources |
| 204 — Interface | External 1 |
| 206 — Subnet Mask | 255.255.0.0 |
| 208 — MTU | 1500 |
| 210 — IP Ranges | 10.5.5.55 - .60 |
| 212 — Gateway | 10.5.0.1 |
| 214 — DNS Server | 10.8.0.3 |
| 216 — Failover DNS | 10.8.0.4 |
| 218 — DNS Domain | hr.company.com |
| 220 — Profile Scope | none |
| 222 — Member Nodes | 1  10.5.5.55 |
|  | 2  10.5.5.56 |
|  | 3  10.5.5.57 |
|  | 4  10.5.5.58 |

| 202 | ext - IT |
| --- | --- |
| 203 | External Interface for IT |

| | | |
| --- | --- | --- |
| 204 | Interface | External 2 |
| 206 | Subnet Mask | 255.255.0.0 |
| 208 | MTU | 1500 |
| 210 | IP Ranges | 10.6.10.50 - .59 |
| 212 | Gateway | 10.6.0.1 |
| 214 | DNS Server | 10.8.0.3 |
| 216 | Failover DNS | 10.8.0.4 |
| 218 | DNS Domain | it.company.com |
| 220 | Profile Scope | all |
| 222 | Member Nodes | |
| | 1 | 10.6.10.50 |
| | 2 | 10.6.10.51 |
| | 3 | 10.6.10.52 |
| | 4 | 10.6.10.53 |
| | 5 | 10.6.10.54 |
| | 6 | 10.6.10.55 |
| | 7 | 10.6.10.56 |
| | 8 | 10.6.10.57 |
| | 9 | 10.6.10.58 |
| | 10 | 10.6.10.59 |

Configure Profile

_Profile details_ > _Profile IP Ranges_ > _Profile Nodes_

| | |
|---:|:---|
| Enter Profile Name: | ext-HR |
| Description: | External Interface fo |
| Netmask: | 255.255.0.0 |
| Gateway: | 10.5.0.1 |
| Primary DNS#Resolver: | 10.8.0.3 |
| Secondary DNS Resolver: | 10.8.0.4 |
| MTU: | 1500 ▼ |
| Interface: | External-1 ▼ |
| Profile Scope: | none ▼ |

[ < Back ]  [ Next > ]   [ Cancel ]

*FIG. 6A*

Profile details > Profile IP Ranges > Profile Nodes

Enter a range of IP addresses:

Low IP: 10.5.5.55

High IP: 10.5.5.60

[ < Back ] [ Next > ]    [ Cancel ]

*FIG. 6B*

Profile details > Profile IP Ranges > Profile Nodes

Select which nodes you want to include in this profile (note that only those nodes available for interface "External-1" are shown):

|   | Node | Node Type |
|---|------|-----------|
| ☑ | Node 1 | storage |
| ☑ | Node 2 | storage |
| ☑ | Node 3 | storage |
| ☑ | Node 4 | storage |

[ Select all ]  [ Unselect all ]

[ < Back ] [ Next > ]    [ Cancel ]

*FIG. 6C*

| 202 — | ext – HR – NEW |
|---|---|
| 203 — | Current External Interface for Human Resources |
| 204 — | Interface | External – 1 |
| 206 — | Subnet Mask | 255.255.0.0 |
| 208 — | MTU | 1500 |
| 210 — | IP Ranges | 10.5.5.65 – .70 |
| 212 — | Gateway | 10.5.0.1 |
| 214 — | DNS Server | 10.8.0.3 |
| 216 — | Failover DNS | 10.8.0.4 |
| 218 — | DNS Domain | hr.company.com |
| 220 — | Profile Scope | none |
| 222 — | Member Nodes | 1  10.5.5.65<br>2  10.5.5.66<br>3  10.5.5.67<br>4  10.5.5.68 |

| 202 — | ext – HR |
|---|---|
| 203 — | Previous External Interface for Human Resources |
| 204 — | Interface | External – 1 |
| 206 — | Subnet Mask | 255.255.0.0 |
| 208 — | MTU | 1500 |
| 210 — | IP Ranges | 10.5.5.55 – .60 |
| 212 — | Gateway | 10.5.0.1 |
| 214 — | DNS Server | 10.8.0.3 |
| 216 — | Failover DNS | 10.8.0.4 |
| 218 — | DNS Domain | hr.company.com |
| 220 — | Profile Scope | none |
| 222 — | Member Nodes | (inactive) |

SYSTEMS AND METHODS FOR CONFIGURING MULTIPLE NETWORK INTERFACES

LIMITED COPYRIGHT AUTHORIZATION

A portion of disclosure of this patent document includes material which is subject to copyright protection. The copyright owner has no objection to the facsimile reproduction by any one of the patent document or the patent disclosure that appears in the Patent and Trademark Office patent file or records, but otherwise reserves all copyrights whatsoever.

FIELD OF THE INVENTION

This invention relates generally to systems and methods for configuring network interfaces.

BACKGROUND

The increase in processing power computer systems has ushered in a new era in which information is accessed on a constant basis. One response has been to distribute processing requests across multiple nodes or devices. A distributed architecture allows for more flexible configurations with respect to factors such as speed, band-width management, and other performance and reliability parameters.

A distributed architecture may support multiple sub-networks with different network interface configurations. Problems may arise for administrators who manage sub-networks with multiple network interfaces across a distributed architecture.

Because of the foregoing challenges and limitations, there is an ongoing need to improve the manner in which nodes of a distributed architecture are configured in network interfaces. Additionally, there is an ongoing need, generally, to improve the manner in which sub-networks are configured, whether such sub-networks include a clustered node of computers, multiple network interfaces on a single computer, or a clustered node of computers with multiple network interfaces.

SUMMARY OF THE INVENTION

The systems and methods generally relate to configuring multiple network interfaces based on a network profile.

In one embodiment, a network profile automatically generated based on user inputs and stored in a memory of a computing device is provided. The network profile may include a profile identifier; a plurality of interface identifiers; and a set of network addresses, wherein a subset of the set of network addresses is associated with a plurality of network interfaces identified by the plurality of interface identifiers.

In another embodiment, a network profile that specifies whether a network interface is automatically a member of the network profile is provided. The network profile may include at least one interface application criterion; a plurality of interface identifiers; and a set of network addresses, wherein a subset of the set of network addresses is associated with a plurality of network interfaces identified by the plurality of interface identifiers.

In another embodiment, a method of configuring a plurality of network interfaces based on a network profile is provided. The method may include receiving at least one interface parameter; receiving a plurality of network interface identifiers; creating a network profile based on the at least one interface parameter and the plurality of network interface identifiers, comprising associating the at least one interface parameter with the plurality of network interface identifiers; storing the network profile in a memory; and executing a configuration module that configures a plurality of network interfaces based on the network profile, comprising applying the at least one interface parameter to the plurality of network interfaces corresponding to the network interface identifiers.

In another embodiment, a method of configuring a network interface based on a configuration file for configuring multiple network interfaces is provided. The method may include receiving at least one configuration file, wherein the configuration file comprises at least one interface parameter; determining whether the at least one interface parameter applies to the network interface; if the at least one interface parameter applies to the network interface, configuring the network interface based on the at least one interface parameter.

In another embodiment, a method for managing network profiles for multiple network interfaces is provided. The method may include requesting user input to define network profiles, wherein the user input comprises interface parameters to be applied to multiple network interfaces; organizing the user input into network profiles; and storing the network profiles to a configuration file formatted as input for a configuration module that configures the multiple network interfaces based on the network profiles.

In another embodiment, a method of migrating IP addresses for a plurality of network interfaces is provided. The method may include configuring a plurality of network interfaces based on a network profile, wherein the network profile identifies the IP addresses of the plurality of network interfaces; modifying the network profile to identify at least one different IP address for at least one of the plurality of network interfaces; and executing a configuration module that rebuilds at least one of the plurality of network interfaces with the at least one different IP address based on the network profile.

In another embodiment, a system for configuring multiple network interfaces with a network profile is provided. The system may include a user interface module, the user interface module configured to receive user input comprising interface parameters corresponding to network profiles, and further configured to output configuration parameters corresponding to the network profiles; and a configuration module, the configuration module adapted to implement a plurality of network interfaces based on the configuration parameters corresponding to the network profiles.

In another embodiment, a data structure for a network profile is provided. The data structure may include a first field configured to store information relating to an interface parameter; a second field configured to store information relating to a network interface identifier; wherein the first field and the second field are stored in a memory system such that the first field and the second field are associated together.

In another embodiment, a system for configuring multiple network interfaces with a network profile is provided. The system may include a first module configured to receive at least one interface parameter, the first module further configured to receive a plurality of network interface identifiers, the first module further configured to create a network profile based on the at least one interface parameter and the plurality of network interface identifiers, comprising associating the at least one interface parameter with the plurality of network interface identifiers, and the first module further configured to store the network profile in a memory; and a second module configured to configure a plurality of network interfaces based on the network profile, comprising applying the at least one interface parameter to the plurality of network interfaces corresponding to the network interface identifiers.

BRIEF DESCRIPTION OF THE DRAWINGS

FIGS. 2A, 2B, and 2C illustrate embodiments of network profiles for three exemplary sub-networks.

FIGS. 6A, 6B, and 6C illustrate one embodiment of user input dialogs for creating an exemplary external interface network profile.

FIGS. 9A and 9B illustrate one embodiment of network profiles corresponding to a sub-network whose network addresses have been migrated.

Figure 1A:
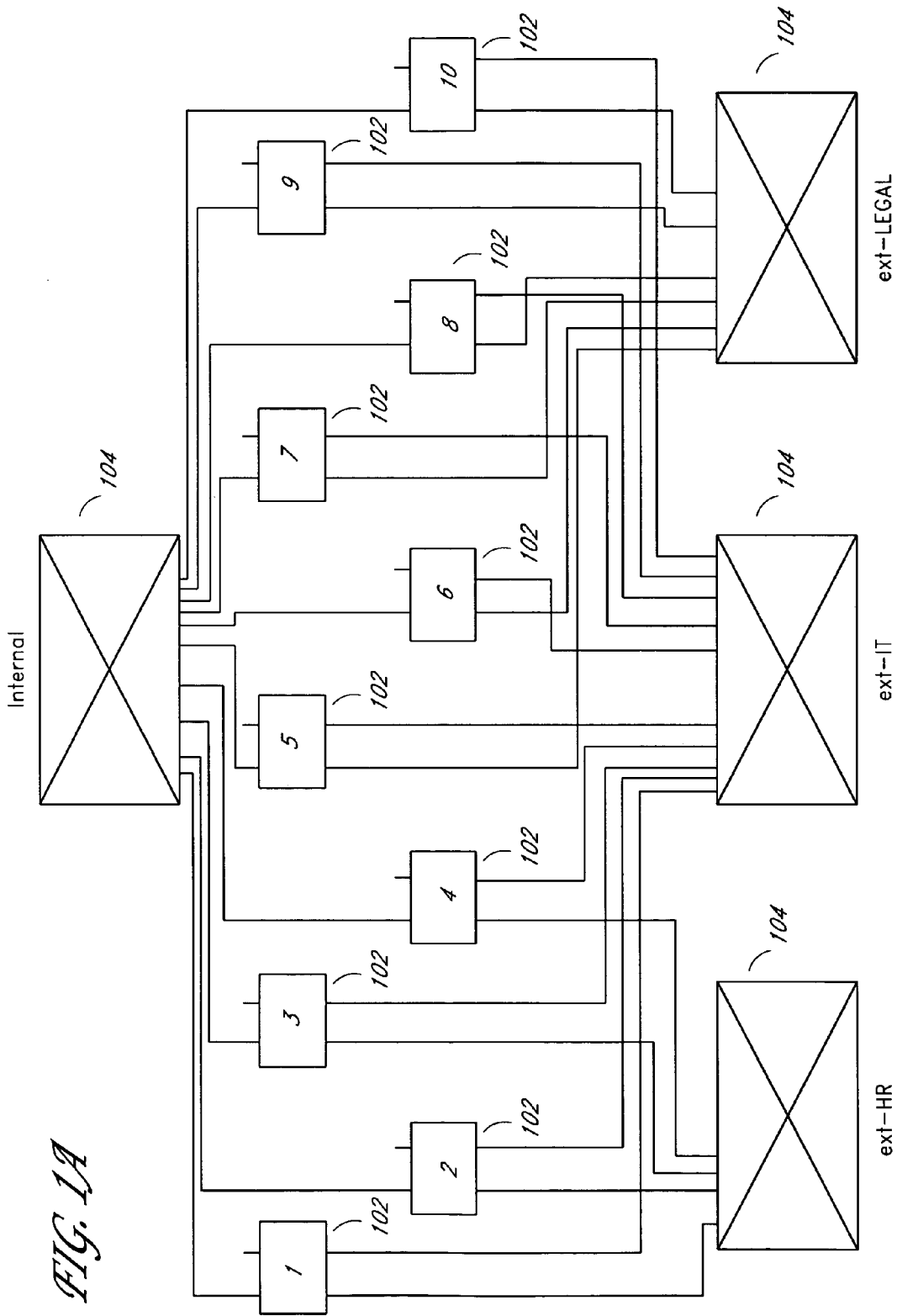
FIGS. 1A and 1B illustrate an embodiment of a networked cluster of computers with multiple sub-networks.

These and other features will now be described with reference to the drawings summarized above. The drawings and the associated descriptions are provided to illustrate embodiments of the invention and not to limit the scope of the invention. Throughout the drawings, reference numbers may be re-used to indicate correspondence between referenced elements. In addition, the first digit of each reference number generally indicates the figure in which the element first appears.

DETAILED DESCRIPTION OF PREFERRED EMBODIMENTS

Systems and methods which represent one embodiment of an example application of the invention will now be described with reference to the drawings. Variations to the systems and methods which represent other embodiments will also be described.

For purposes of illustration, some embodiments will be described in the context of a distributed file system. The present invention is not limited by the type of environment in which the systems and methods are used, however, and systems and methods may be used in other environments, such as, for example, other file systems, other distributed systems, the Internet, the World Wide Web, a private network for a hospital, a broadcast network for a government agency, and an internal network for a corporate enterprise, an Internet, a local area network, a wide area network, a wired network, a wireless network, and so forth. Some of the figures and descriptions, however, relate to the embodiment of the invention wherein the environment is that of a distributed file system. It is also recognized that in other embodiments, the systems and methods may be implemented as a single module and/or implemented in conjunction with a variety of other modules and the like. Moreover, the specific implementations described herein are set forth in order to illustrate, and not to limit, the invention. The scope of the invention is defined by the appended claims.

One example of a distributed file system, in which embodiments of systems and methods described herein may be implemented, is described in U.S. patent application Ser. No. 10/007,003 entitled "Systems and Methods for Providing a Distributed File System Utilizing Metadata to Track Information About Data Stored Throughout the System," filed Nov. 9, 2001 which claims priority to Application No. 60/309,803 filed Aug. 3, 2001, U.S. patent application Ser. No. 10/281,467 entitled "Systems and Methods for Providing A Distributed File System Incorporating a Virtual Hot Spare," filed Oct. 25, 2002, and U.S. patent application Ser. No. 10/714,326 entitled "Systems And Methods For Restriping Files In A Distributed File System," filed Nov. 14, 2003, which claims priority to Application No. 60/426,464, filed Nov. 14, 2002, all of which are hereby incorporated by reference herein in their entirety.

I. Overview

In general, embodiments of the invention relate to configuring, managing, distributing, and overlaying sophisticated network topologies onto a cluster of heterogeneous or homogeneous nodes that comprise a clustered file system. Networked computers communicate via network interfaces on the respective nodes of the cluster. Nodes with multiple network interfaces may be configured to participate in a variety of sub-networks within the cluster. Within the sub-networks, the network interfaces of the member nodes may share identical, similar, or related interface parameter settings, which specify how the respective members of the sub-network communicate with each other and with other connected networks. Presently, network administrators configure each network interface manually by logging into a particular member node and setting the respective interface parameter settings for the respective interfaces of that member node. Configuring multiple interfaces on a given node with completely different settings may be difficult. Embodiments of the invention facilitate the process of configuring, managing, distributing, and overlaying these sub-networks by adding automation into the configuration of multiple network interfaces with a common network profile.

Although the drawings and accompanying description generally describe embodiments of the invention in terms of a distributed architecture, embodiments of the invention are not limited in application to a networked cluster of computers. Systems and methods for automating the configuration of multiple network interfaces based on network profiles also improve the process of configuring multiple network interfaces on a single, monolithic computer system.

II. Exemplary Sub-Network Configurations

Figure 1B:
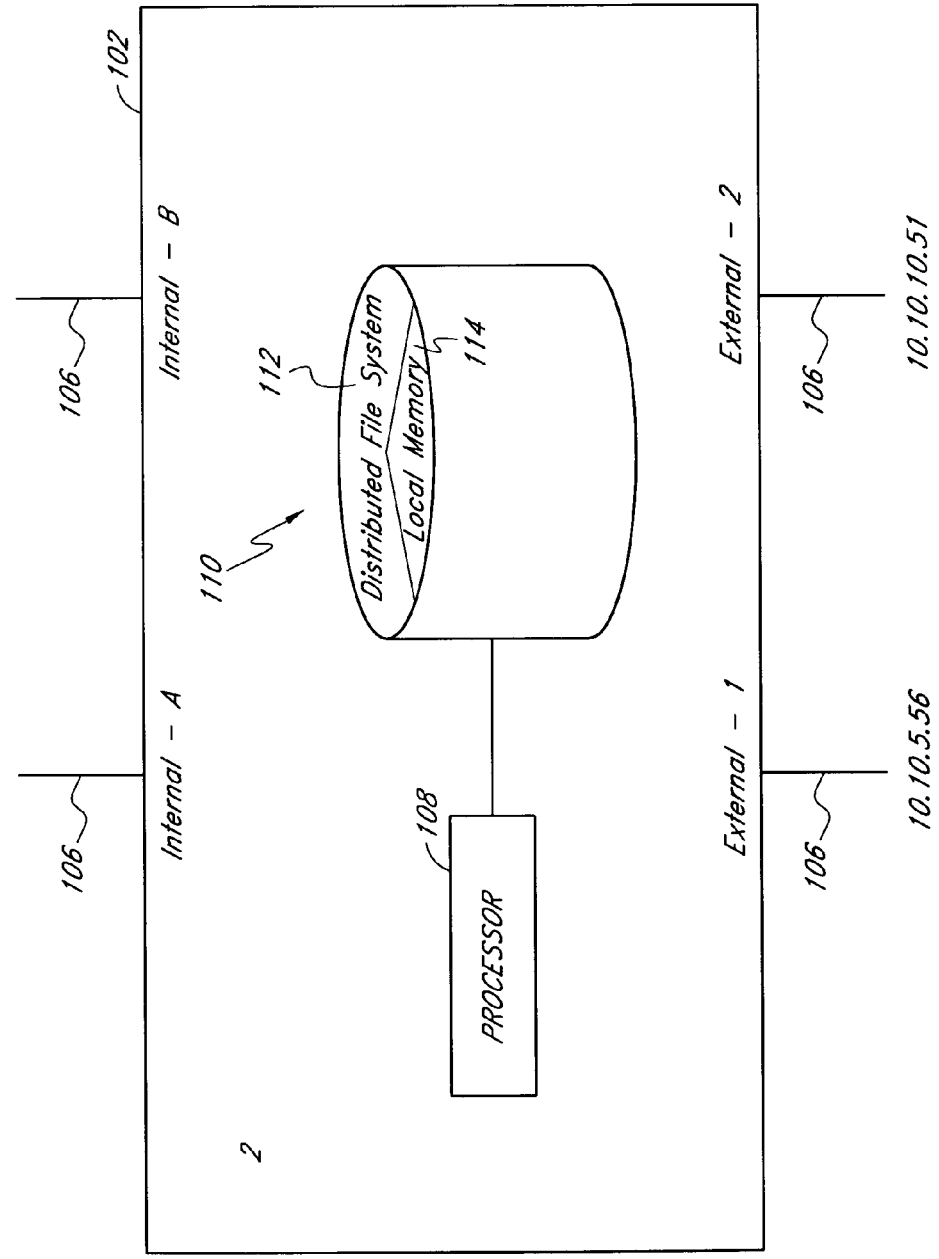

FIGS. 1A and 1B illustrate an exemplary networked cluster of nodes with multiple sub-networks. FIG. 1A illustrates a distributed system 100 that includes ten nodes 102. The nodes 102 are configured in multiple sub-networks via physical connections through switches 104. As illustrated, distributed system 100 is configured into four distinct sub-networks: "Internal," "ext-HR," "ext-IT," and "ext-LEGAL."

Conceptually, network traffic to each node in a cluster can be generally split into two types: internal traffic and external traffic. These are also referred to as back-end traffic and front-end traffic. Back-end traffic includes inter-node communication among nodes in a cluster, including remote disk block requests, lock coordination traffic, and so forth. In one embodiment, the back-end network generally includes all the nodes in a cluster.

Front-end traffic includes communication with the rest of the network. It may include Network File System (NFS) and Common Internet File System (CIFS) traffic, Secure Shell (SSH) and Hypertext Transfer Protocol (HTTP) access to the cluster, client read-and-write operations, and so forth. In a heterogeneous cluster, there will likely be many nodes that do not have any front-end network configured in order to conserve switch ports or simply to disallow external access to storage nodes, for example. An exemplary heterogeneous cluster and corresponding embodiments of the invention related to heterogeneous clusters are described in more detail below with reference to FIGS. 10 and 11.

In one embodiment, each of the nodes 102 is connected to the "Internal" sub-network, making it a fully connected topology. This internal, or back-end, network handles communication among member nodes 102 of distributed system 100. In FIG. 1A, three external, or front-end, networks handle communication between the nodes 102 and networks or computers outside of the distributed system 100. The "ext-HR" sub-network includes four member nodes (node 1, node 2, node 3, and node 4). The "ext-IT" sub-network includes all ten of the nodes 102. The "ext-LEGAL" sub-network includes six member nodes (node 5, node 6, node 7, node 8, node 9, and node 10). As will be discussed in further detail below, network profiles may be implemented to configure both internal and external sub-networks of a distributed system, such as distributed system 100.

Although in the illustrated embodiment nodes 102 are arranged in a fully connected network topology (for the "Internal" network), in other embodiments of the invention, nodes 102 may be arranged in other topologies, including, but not limited to, the following topologies: ring, mesh, star, line, tree, bus topologies, and so forth. It will be appreciated by one skilled in the art that various network topologies and/or combinations thereof may be used to implement different embodiments of the invention. In addition, it is recognized that nodes 102 may be connected directly, indirectly, or a combination of the two, and that all of the nodes 102 may be connected using the same type of connection or one or more different types of connections. It is also recognized that in other embodiments, a different number of nodes may be included in the cluster, such as, for example, 2, 16, 83, 6, 883, 10,000, and so forth.

In one embodiment, the nodes 102 are interconnected through a bi-directional communication link where messages are received in the order they are sent. In one embodiment, the link comprises a "keep-alive" mechanism that quickly detects when nodes or other network components fail, and the nodes are notified when a link goes up or down. In one embodiment, the link includes a Transmission Control Protocol (TCP) connection. In other embodiments, the link includes an Session Description Protocol (SDP) connection over Infiniband, a wireless network, a wired network, a serial connection, Internet Protocol (IP) over FibreChannel, proprietary communication links, connection based datagrams or streams, and/or connection based protocols.

FIG. 1B illustrates, in more detail, an exemplary node 102 (node 2) of the distributed system 100. In general, a node in a distributed system may have two, four, and possibly many more physical network interface ports. Nodes within a cluster may have different numbers of physical network interface ports. A Logical Network Interface (LNI) layer may help define a set of logical interface names. The LNI layer may then be responsible for mapping these logical interface names to the underlying physical network interfaces, depending on the node hardware. In the illustrated embodiment, there are four logical network interfaces, named "Internal-A," "Internal-B," "External-1," and "External-2." It is the responsibility of the LNI layer to map these logical interfaces to physical network ports. This mapping allows the network administrator to not have to think in terms of physical ports and to keep track of each node's interface names. The LNI layer may also be able to support dynamic remapping of physical ports to logical ports. For example, if a node's physical network port gets damaged or otherwise fails, an administrator may dynamically remap the logical interface name for that physical port to another available physical network port on the node. In some high-performance storage environments, an administrator may also configure the LNI layer to bond two physical interfaces together, essentially doubling the throughput capability of the node's external network. The details of the physical port bonding, including loading and special network driver, setting up and tearing down the individual ports, and so forth, is handled by the LNI layer. To the administrator, the bonded ports are simply referred to as a single logical interface name.

In the illustrated embodiment, each node 102 includes four network interfaces 106. As illustrated, two of the interfaces 106 correspond to connections for internal sub-networks, and two of the interfaces 106 correspond to connections for external sub-networks. Network interfaces may be assigned network addresses for purposes of identification and communication. As illustrated, exemplary interface "Internal-A" has been assigned the IP address of 192.168.129.61. Although in the illustrated embodiments network addresses are generally IP addresses, embodiments of the invention may be implemented with other suitable network address protocols. Exemplary interface "Internal-B" is not connected in the exemplary configuration. In some embodiments, interfaces "Internal-A" and "Internal-B" may be bonded together to provide increased network bandwidth. The interface "External-1" has been assigned the IP address of 10.10.5.56. Exemplary interface "External-2" has been assigned the IP address 10.10.10.51.

In the illustrated embodiment, nodes 102 of the distributed system 100 include a processor 108 and a memory 110. The illustrated memory 110 is divided into two partitions: a distributed memory partition 112 and a local file system partition 114. It will be appreciated by one skilled in the art that memory 110 may include random access memory (RAM), a hard disk drive (or array of drives), and combinations of the same and other suitable equivalents. In one embodiment, the distributed memory partition 112 is reserved for the respective portion of an exemplary distributed file system allocated to the respective node 102 of distributed system 100. The local memory partition 114 is reserved for the data and programs that the respective node 102 uses to operate and manage its shared or dedicated responsibilities for the distributed file system implemented on the distributed system 100. The local memory partition 114 may, for example, store an exemplary user interface module for receiving network profiles, an exemplary local configuration file that includes the network profiles for the distributed system 100 (or a subset of the network profiles), and an exemplary configuration module that builds network interfaces for the respective node 102 based on the network profiles written in the configuration file. Embodiments of the user interface module, configuration file, and configuration module are discussed in greater detail below.

As used herein, the word module refers to logic embodied in hardware or firmware, or to a collection of software instructions, possibly having entry and exit points, written in a programming language, such as, for example, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware.

In one embodiment, the distributed system 100 may comprise a variety of computer systems such as, for example, a computer, a server, a smart storage unit, and so forth. In one embodiment, the computer may be a general purpose computer using one or more microprocessors, such as, for example, a Pentium processor, a Pentium II processor, a Pentium Pro processor, a Pentium IV processor, an x86 processor, an 8051 processor, a MIPS processor, a Power PC processor, a SPARC processor, an Alpha processor, and so forth. The computer may run a variety of operating systems that perform standard operating system functions such as opening, reading, writing, and closing a file. It is recognized that other operating systems may be used, such as, for example, Microsoft® Windows® 3.X, Microsoft® Windows 98, Microsoft® Windows® 2000, Microsoft® Windows® NT, Microsoft® Windows® CE, Microsoft® Windows® ME, Palm Pilot OS, Apple®V MacOS®, Disk Operating System (DOS), UNIX, IRIX, Solaris, SunOS, FreeBSD, Linux®, or IBM® OS/2® operating systems.

III. Exemplary External Network Profiles

Due to the capacity limitations of traditional network storage devices, a large-scale corporate network might have a network storage device for every major department. Since major departments typically have their own internal sub-networks, separate storage devices seem to fit naturally into this model. A file system, however, that can scale up to hundreds of terabytes of storage capacity makes a compelling case for IT departments to consolidate their storage and eliminate all the redundant infrastructure needed to support them. A single storage device used by many different departments on different subnets may require a sophisticated, flexible, yet administrator-friendly network management utility. Network profiles allow an administrator to support different network configurations for different nodes within the same cluster. A network profile can be applied to an arbitrary group of nodes within a cluster, and a cluster can be configured with any number of network profiles.

In general, network profiles include various data fields that collectively identify and define the network characteristics and relationships of a corresponding sub-network. Some of the fields may help identify the sub-network to which a network profile corresponds. Other fields may specify network interface parameters that define the specific characteristics of the sub-network corresponding to the respective network profile 200. Yet other fields may specify information that may be used by a configuration module to manage the relationship between network interfaces corresponding to the respective network profile.

FIGS. 2A, 2B, and 2C illustrate exemplary embodiments of network profiles for three exemplary external sub-networks of the distributed system 100. FIG. 2A illustrates an exemplary network profile for the "ext-HR" sub-network. As described above with reference to FIG. 1, the "ext-HR" sub-network includes four nodes 102 (node 1, node 2, node 3, and node 4) of the distributed system 100; the "ext-IT" sub-network includes ten nodes 102 (node 1, node 2, node 3, node 4, node 5, node 6, node 7, node 8, node 9, and node 10); and the "ext-LEGAL" sub-network includes six nodes (node 5, node 6, node 7, node 8, node 9, and node 10).

In the illustrated embodiment, the exemplary external network profiles 200 include various data fields, including data fields specifying profile identifiers, interface parameters, and member parameters. For example, some of these data fields may identify and describe the respective external network profiles 200; these fields may be referred to as profile identifiers. For example, profile name field 202 specifies a name by which the respective external network profile 200 may be identified. The profile description field 203 specifies a description of the purpose and/or function of the respective external network profile 200.

The exemplary external network profiles 200 also include interface parameter fields. These data fields specify the particular interface parameter settings that define the operating characteristics of a particular sub-network. In the illustrated embodiment, interface field 204 specifies the logical interface 106 that the nodes 102 included in the respective external network profile 200 use to connect to the sub-network. Accordingly, the nodes 102 that are members of the respective external network profile 200 use the interface specified in the interface field 204 in order to connect to the sub-network. As illustrated in FIGS. 2A and 2B, the illustrated external network profiles 200, defining respectively external sub-networks "ext-HR" and "ext-LEGAL," specify the same interface connection "External-1" in their respective interface field 204. Because the nodes 102 of these sub-networks are connected through the same logical interface 106, "External-1," the respective nodes 102 may, in the illustrated embodiment, belong to only one of these two sub-networks, which use "External-1" exclusively. Thus, as illustrated, sub-network "ext-HR" includes node 1, node 2, node 3, and node 4, and sub-network "ext-LEGAL" includes node 5, node 6, node 7, node 8, node 9, and node 10. Similarly, as illustrated in FIG. 2C, the member nodes 102 belonging to the sub-network "ext-IT" are connected through logical interface "External-2." Because the sub-network "ext-IT" includes all of the nodes 102 of the distributed system 100, none of the nodes 102 of the distributed system 100 are connected to another sub-network through the logical interface "External 2."

It will be appreciated by one skilled in the art that, in other embodiments, external network profiles 200 may apply to nodes 102 that connect via different logical interfaces 106. For example, a sub-network might include two nodes 102 (or even the same node 102) connected via "External-1" and "External-2," respectively. In these embodiments, the external network profiles 200 may specify an interface field 204 for each node 102 that is included in the sub-network corresponding to the respective profile.

In the illustrated embodiment, another interface parameter is the IP ranges field 210. The IP ranges field 210 specifies the IP addresses available to the respective sub-network that may be assigned to the specified interface of the member nodes 102 of the sub-network. Although the illustrated embodiment defines the network addresses to be IP addresses, in other embodiments network profiles may use other suitable network addresses. In the illustrated embodiment, the external network profiles 200 include as many member nodes 102 as correspond to the available range of IP addresses. In other words, if an external network profile 200 has a range of five IP addresses, then that external network profile 200 has five member nodes. For example, the "ext-HR" sub-network, as illustrated in FIG. 2A, has been assigned six available IP addresses, corresponding to the IP addresses between 10.5.5.55 to 10.5.5.60. Thus, six nodes may be accommodated by the "ext-HR" sub-network. It is not necessary, however, that a network profile use all of the available IP addresses assigned to it. Thus, as illustrated, the "ext-HR" sub-network includes four member nodes. These member nodes are the logical interface "External-1" of node 1, node 2, node 3, and node 4. Two more additional interfaces may be assigned to the sub-network "ext-HR" before the network profile 200 corresponding to sub-network "ext-HR" exhausts the available IP addresses.

In other embodiments, an external network profile 200 may not specify an available IP range, but rather dynamically assign IP addresses to the specified interfaces of the nodes 102 included in the sub-network. It will be appreciated by one skilled in the art that there are many suitable ways in which IP addresses may be assigned to the interfaces of the respective nodes 102.

In addition, the exemplary external network profiles 200 also include other interface parameters. The subnet mask field 206 specifies the subnet mask used by the respective network switch 104 to route communication to the nodes 102. The MTU field 208 specifies the maximum transmission unit (MTU) for the sub-network defined by the respective network profile 200. The gateway field 212 identifies the network address of the gateway for the sub-network defined by the respective network profile 200. Similarly, the DNS server field 214 identifies the network address of the DNS server for the respective sub-network, and the failover DNS field 216 specifies the network address for the failover DNS server for the respective sub-network. The DNS domain field 218 identifies the domain name corresponding to the respective sub-network. In some embodiments, virtual IP, virtual IP bindings, and secondary DNS resolvers may also be interface parameters.

In the illustrated exemplary external network profiles 200, some of the interface fields specify identical settings. For example, the illustrated external network profiles 200 have the same MTU, the same subnet mask, the same DNS server, and the same failover DNS. In other embodiments, the respective sub-networks may be configured with different interface parameters.

The exemplary external network profiles 200 also include membership parameter fields. These data fields may specify certain identifying characteristics of members of the respective external network profile 200. For example, in the illustrated embodiment, profile scope field 220 specifies a node type, which corresponds to a common category of nodes that are automatically included as members of the respective external network profile 200. Automatic members are configured according to the respective network profile 200 once a configuration module determines that a newly connected node 102 corresponds to a node type identified for automatic configuration by the respective external network profile 200. Examples of specific node types may include: "all," "none," "accelerator," and "storage." As illustrated in FIGS. 2A and 2B, the profile scope of the "ext-HR" and "ext-LEGAL" sub-networks have a profile scope of "none." In the illustrated embodiment, the profile scope of "none" indicates that, when a new node 102 is added to the distributed system 100, the respective network profiles 200 do not automatically apply. In contrast, the "ext-IT" sub-network specifies a profile scope of "all," as illustrated in FIG. 2C. In the illustrated embodiment, a profile scope of "all" indicates that when any node 102 is added to the distributed system 100, the respective node is automatically added to the "ext-IT" sub-network. It will be appreciated by one skilled in the art that there are many suitable ways for specifying node types and that other categorizations for automatic membership may also be used. For example, exclusion and/or inclusion of membership in network profiles, such as external network profiles 200, may be based on criteria such as, but not limited to, node type, logical interface type, physical interface type, dynamic load, static load, physical network type, physical location, and combinations of the same and their equivalents. With respect to criteria based on physical interface type, network profiles may be based on, for example, Gigabit Ethernet (GE), 10 Gigabit Ethernet (10 GE), Infiniband, and so forth. Thus, network profiles may be designed that would automatically include, for example, 10 GE ports in a particular profile and GE ports in another profile.

In the illustrated embodiment, member nodes field 222 is another membership parameter. The member nodes field 222 identifies a set of nodes 102 of the distributed system 100 that belong to the sub-network corresponding to the respective network profile 200. Taken together with the logical interface 106 specified in the interface field 204, the member entries in the member nodes field 222 may constitute a network interface identifier. In other words, an identifier for a specific logical interface 106 on a specific node 102 may be used to identify a particular network interface in a distributed system—that is, may be used as a network interface identifier (or interface identifier). Although in the illustrated embodiment the members of the external network profile 200 are separate nodes 102 connected to the same logical interface, such as "External-1," in other embodiments the members of a network profile may be separate logical interfaces on the same, monolithic computer. Thus, in some embodiments, the network profile may comprise a field for member interfaces, rather than member nodes. In such a case, an identifier for the member interface itself may constitute a network interface identifier.

In the illustrated embodiment, the member nodes field 222 also specifies the IP address corresponding to the respective member node 102. This IP address is within the range of IP addresses specified by the IP range field 210. The network (IP) addresses of the member nodes may be considered interface parameters that define the respective network interfaces corresponding to member nodes 102.

In the above description, the various data fields of the external network profiles 200 have been described in terms of profile identifiers, interface parameters, and membership parameters. These terms, however, are intended for description and not as strict categories. For example, although interface field 204 is described as an interface parameter, in some senses, it may also be described as a membership parameter because the profile applies only to those logical interfaces corresponding to the type of interface specified. Thus, the terms profile identifiers, interface parameters, and membership parameters may be applied to the same data field. A network profile may include various combinations of the data fields described above, or may include other data fields entirely.

IV. Configuring Multiple Network Interfaces with Network Profiles

Figure 3:
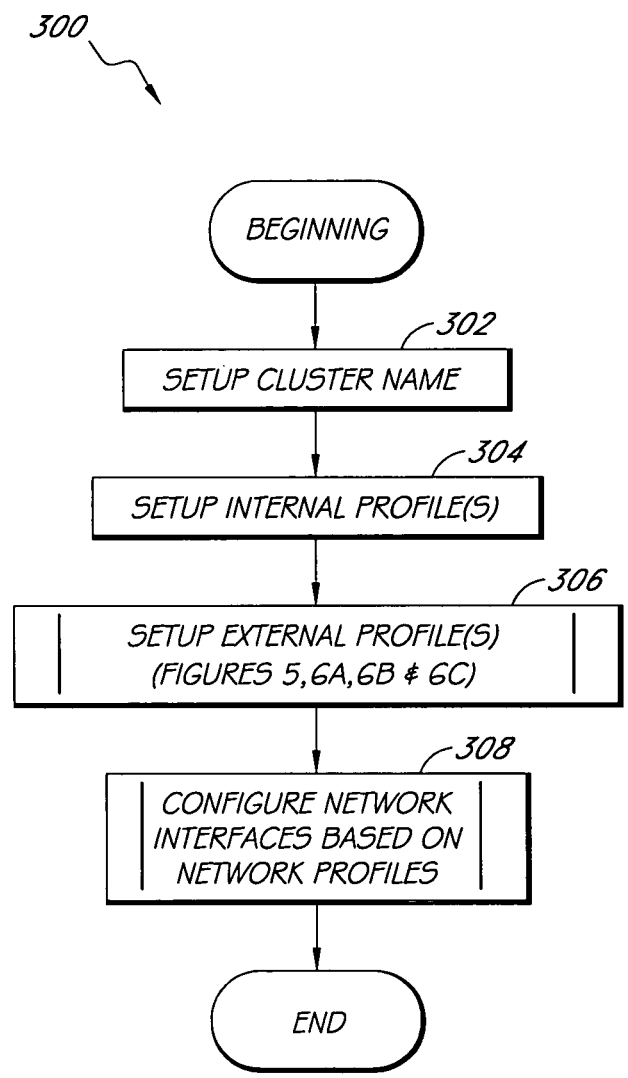
FIG. 3 illustrates a flow chart of one embodiment of operations to set up internal and external sub-networks for a clustered network of computers.

FIG. 3 illustrates a flow chart of one embodiment of operations to set up internal and external sub-networks for a clustered network of computers. The illustrated setup module 300 could be implemented by a network administrator, such as an authorized network administrator for the distributed system 100. These operations may also be automated, in one embodiment, through the use of, for example, a user interface module, a configuration file, and a configuration module. Additionally, each individual operation, or subcomponent operation thereof, may be implemented as separate modules. In some embodiments, some of the operations may be implemented manually, while others are executed automatically.

In state 302, a network administrator assigns a name to the cluster. For example, a network administrator may assign the name "enzo" to the distributed system 100. In state 304, a network administrator creates the internal, or back-end, network profile(s) for the cluster. In many distributed systems, such as the distributed system 100, the cluster of computers will be connected through a single internal, or back-end, sub-network. Internal sub-networks may be defined by network profiles that include fields such as MTU, subnet mask, and IP range. An exemplary internal sub-network is discussed in further detail below with reference to FIG. 11B.

Figure 10:
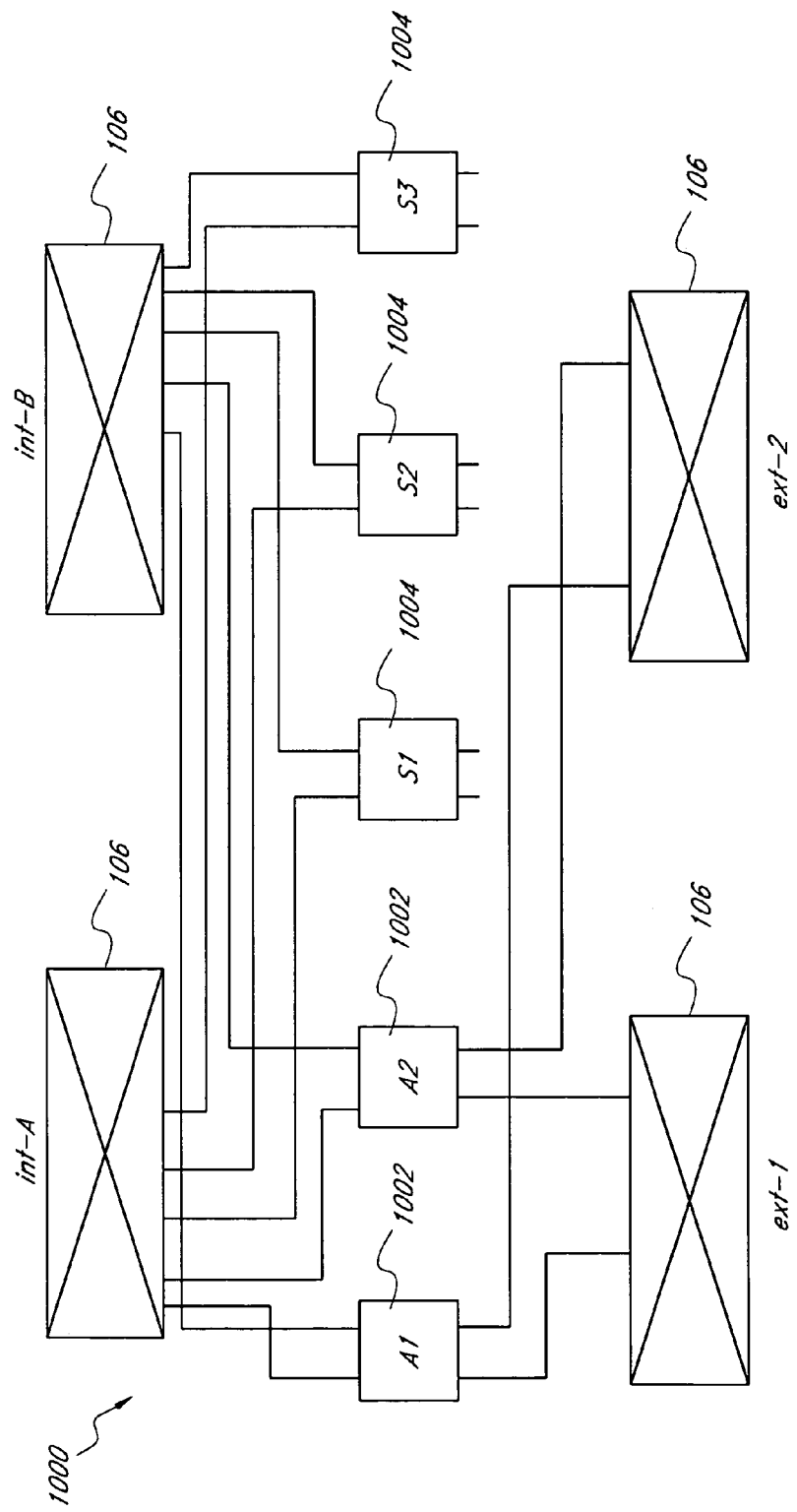
FIG. 10 illustrates one embodiment of a networked cluster of heterogeneous nodes.

In other embodiments, multiple internal sub-networks may be configured for the networked cluster of computers. For example, a common network topology includes two internal sub-networks, wherein each sub-network conforms to a fully connected topology connecting each of the nodes in the cluster. In many cases, the second internal sub-network offers failover services. In these embodiments, a corresponding network profile for the secondary sub-network may specify a failover range of network (for example, IP) addresses. This failover range of IP addresses may be virtual IP addresses for the cluster. These virtual IP addresses may be initially mapped to the IP addresses corresponding to either one of the internal sub-networks. If one of the sub-networks goes down, then the virtual IP addresses may then be remapped to the corresponding IP addresses of the remaining sub-network. This may provide a seamless operation of the back-end network when one of the sub-networks fails. FIG. 10 illustrates a cluster configured with two internal sub-networks.

In state 306, a network administrator specifies external network profile(s) for the cluster of computers. These external profiles define the external sub-networks with which the networked cluster of computers communicates with computers external to the cluster, such as client computers requesting reads or writes from a cluster of computers implementing a distributed file system. The setup operations of external profiles are described in more detail below with reference to FIGS. 5 and 6. Although in the illustrated embodiment, the operations for setting up internal and external profiles are shown sequentially, it is not necessary to set up the profiles in the illustrated order. Nor is it necessary to setup all of the internal profiles and then all of the external profiles. External and internal profiles may be setup in a variety of alternating combinations. External profiles may even be set up before any internal profiles. In some cases, however, it may be necessary to set up at least one internal profile before setting up other profiles.

In state 308, the administrator configures the network interfaces of the clustered network of nodes based on the network profiles created in states 304 and 306. It will be appreciated by one skilled in the art that there are many suitable methods for configuring network interfaces based on network profiles. In one embodiment, the network profiles may be written to a single configuration file that is processed by a configuration module, which configures the network interfaces based on the network profiles written to the configuration file. In another embodiment, the same pattern is implemented for both internal and external profiles. In other words, the internal profiles are written to an internal configuration file and the external profiles are written to an external configuration file, and respective internal and external configuration modules process the respective configuration files. This exemplary embodiment is discussed further below in detail with reference to FIGS. 7A and 7B. It will be appreciated by one skilled in the art that there are many different methods for storing network profiles and processing them to configure network interfaces based on the stored network profiles.

Figure 4:
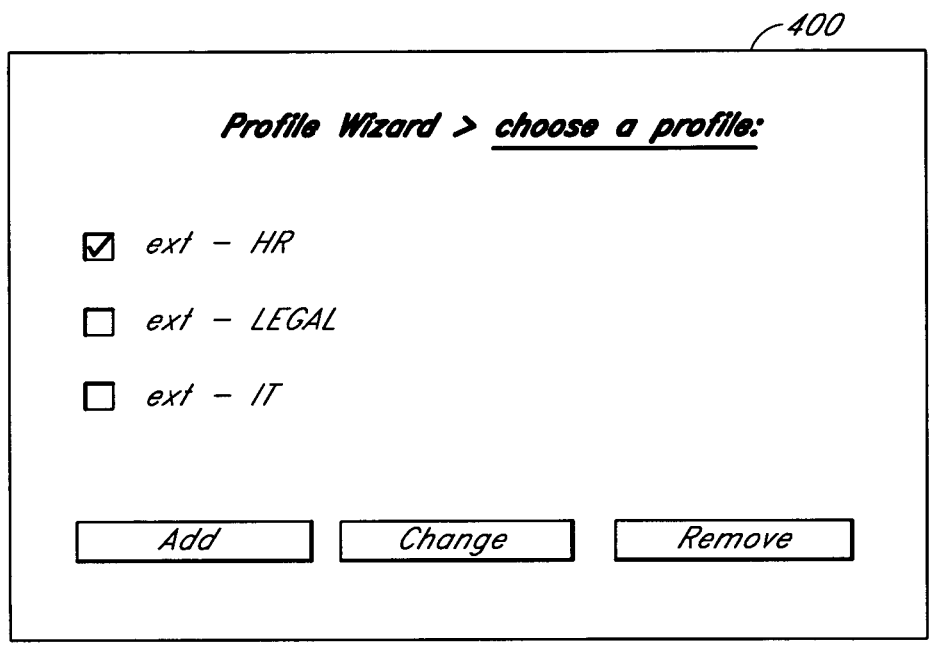
FIG. 4 illustrates one embodiment of a user input dialog for managing network profiles.

FIG. 4 illustrates one embodiment of a user interface for managing network profiles. The profile management dialog window 400 is an exemplary top-level window manager that may be used as part of a graphical user interface (GUI) module to manage the network profiles of a clustered network of computers. As illustrated, the network dialog management window 400 identifies three network profiles, which correspond to the exemplary external network profiles 200. From the network management dialog window 400, the user may add new profiles, change existing profiles, or remove existing profiles. As illustrated, the user has selected the network profile corresponding to the external sub-network "ext-HR." The user may choose to change the existing network profile or remove it completely.

Figure 5:
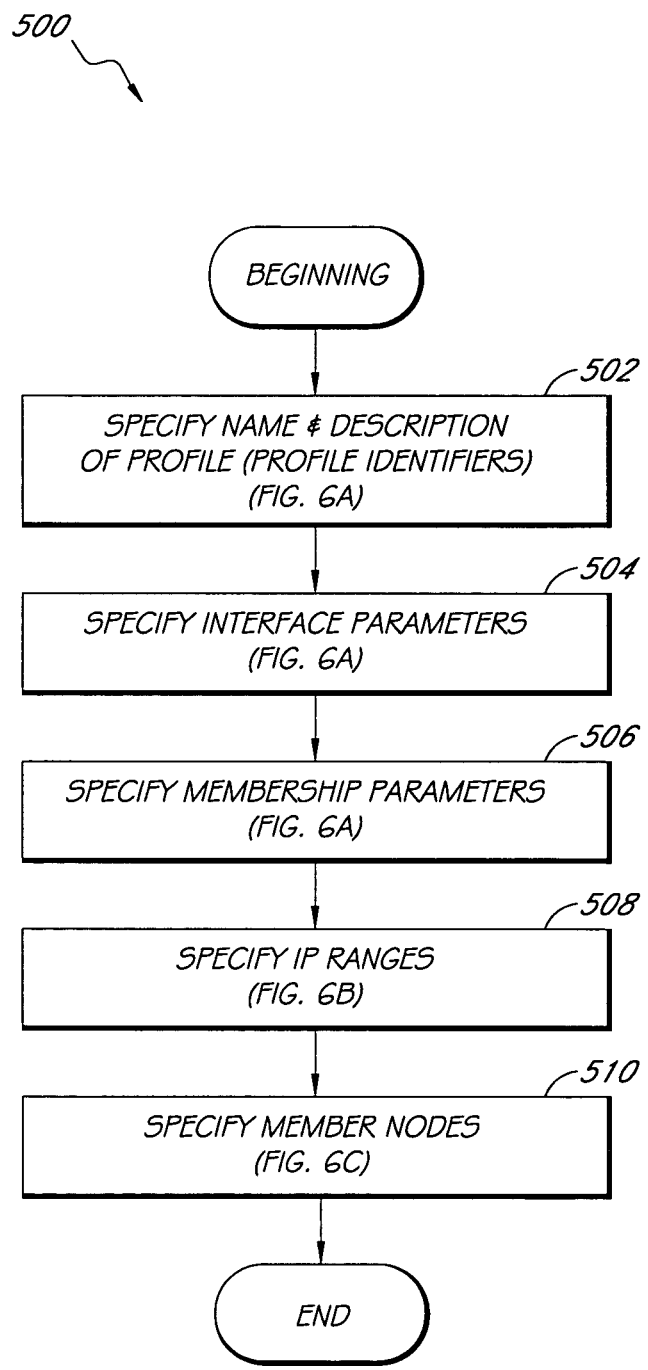
FIG. 5 illustrates a flow chart of one embodiment of operations to set up an exemplary network profile for an external interface.

FIG. 5 illustrates a flow chart of one embodiment of operations to set up an exemplary network profile for an external interface. The external profile setup module 500 may be implemented in whole or in part as a user interface module. Exemplary graphical user interface dialog windows for such a module are illustrated in FIGS. 6A, 6B, and 6C, which are described in further detail below. Although the illustrated embodiment contemplates using a user interface module to request and receive profile information from a network administrator, in other embodiments, a network administrator or other user may define a network profile, such as the exemplary external network profiles 200, by submitting, for example, a text file formatted to identify the respective fields of the profile or by a command line interface. It will be appreciated by one skilled in the art that there are many methods that may be employed to assemble and organize the respective profile fields of particular network profiles.

In state 502, a network administrator specifies the name and description of the profile. Exemplary fields of a user interface for receiving this information are illustrated in FIG. 6A and described in more detail below. In state 504, a network administrator specifies interface parameters. As discussed above with reference to FIGS. 2A, 2B, and 2C, interface parameters include fields of information that specify attributes of the sub-network connections. Exemplary fields of a graphical user interface dialog window for receiving this information are illustrated in FIG. 6A and described in more detail below. In state 506, an administrator specifies membership parameters. As discussed above with reference to FIGS. 2A, 2B, and 2C, membership parameters may be used to define which interfaces (for example, which logical interfaces on which member nodes) belong to a particular profile.

In state 508, a network administrator specifies the IP ranges for a profile. The IP ranges for a network profile define the IP addresses available to the sub-network. That is, the IP ranges define the set of network addresses (IP addresses) that may be assigned to member nodes of the sub-network. A graphical user interface dialog window that requests and receives IP ranges from an administrator is described in further detail below with reference to FIG. 6B. In state 510, a network administrator specifies the member nodes of a profile. In the illustrated embodiment, the member nodes of a respective sub-network are connected through the same logical interface. In other embodiments, however, network profiles may be defined for sub-networks that include heterogeneous interfaces of the same or different nodes. Because, in the illustrated embodiment, the member nodes of a network profile 200 are connected via the same logical interface, which is specified in interface field 204, an administrator specifies the member nodes of the sub-network without further specifying a particular interface. A graphical user interface window dialog that requests and receives member nodes from a network administrator is described in further detail below with reference to FIG. 6C.

FIGS. 6A, 6B and 6C illustrate embodiments of user interfaces for creating an exemplary external interface network profile. FIG. 6A illustrates an exemplary graphical user interface dialog window for specifying certain external network profile details. FIG. 6A illustrates an exemplary graphical user interface dialog window for specifying certain profile details of a network profile. The profile detail dialog window 600 prompts users to specify a profile name and description, to specify interface parameters (such as, for example, the netmask, gateway, primary DNS resolver, the secondary DNS resolver, and the MTU), and to specify membership parameters (such as, for example, the interface and profile scope). Some of the illustrated fields may be empty until the user inputs data. Other illustrated fields may provide the user with predefined options from which the user may select. It will be appreciated by one skilled in the art that there are many ways to implement a user interface dialog window, such as the profile detail dialog window 600.

FIG. 6B illustrates an exemplary graphical user interface dialog window for specifying the IP range of an external network profile. The IP range dialog window 602 prompts network administrators to enter a range of IP addresses available for assignment to the logical interfaces of the member nodes of the sub-network. A network administrator enters a range of IP addresses by specifying a low IP number and a high IP number. For example, in the illustrated embodiment, a network administrator has entered a low IP range of 10.5.5.55 and a high IP address of 10.5.5.60, allocating six IP addresses for the respective sub-network.

FIG. 6C illustrates an exemplary graphical user interface dialog window for specifying member nodes of an external network profile. The profile nodes dialog window 604 includes a list of all nodes available to the respective profile for the logical interface specified by that profile. For example, as illustrated in FIG. 6A, the exemplary network profile being created specifies the logical interface "External-1." In the exemplary embodiment, four nodes are available (node 1, node 2, node 3, and node 4). The remaining six nodes (node 5, node 6, node 7, node 8, node 9, and node 10) are not available on logical interface "External-1," indicating that these nodes are connected to another sub-network via "External-1." In the exemplary embodiment, the administrator has selected the available nodes to be added to the network profile named "ext-HR."

Once a network administrator has created or otherwise modified a network profile, the interfaces of the respective sub-networks may be configured accordingly. It will be appreciated that there are many suitable ways to automate the configuration of network interfaces based on a defined network profile. The embodiment described herein uses a background process (or daemon) operating on the node local to the profile change. When the daemon detects a change to the local configuration file, it resaves the local configuration file as the distributed configuration file. In the illustrated embodiment, another background process operating on all the nodes 102 in the distributed system 100 then resaves the now-modified distributed configuration file as each respective local configuration file, and then executes a configuration module that reads each respective configuration file containing the network profiles and configures the respective network interfaces accordingly.

Figure 7A:
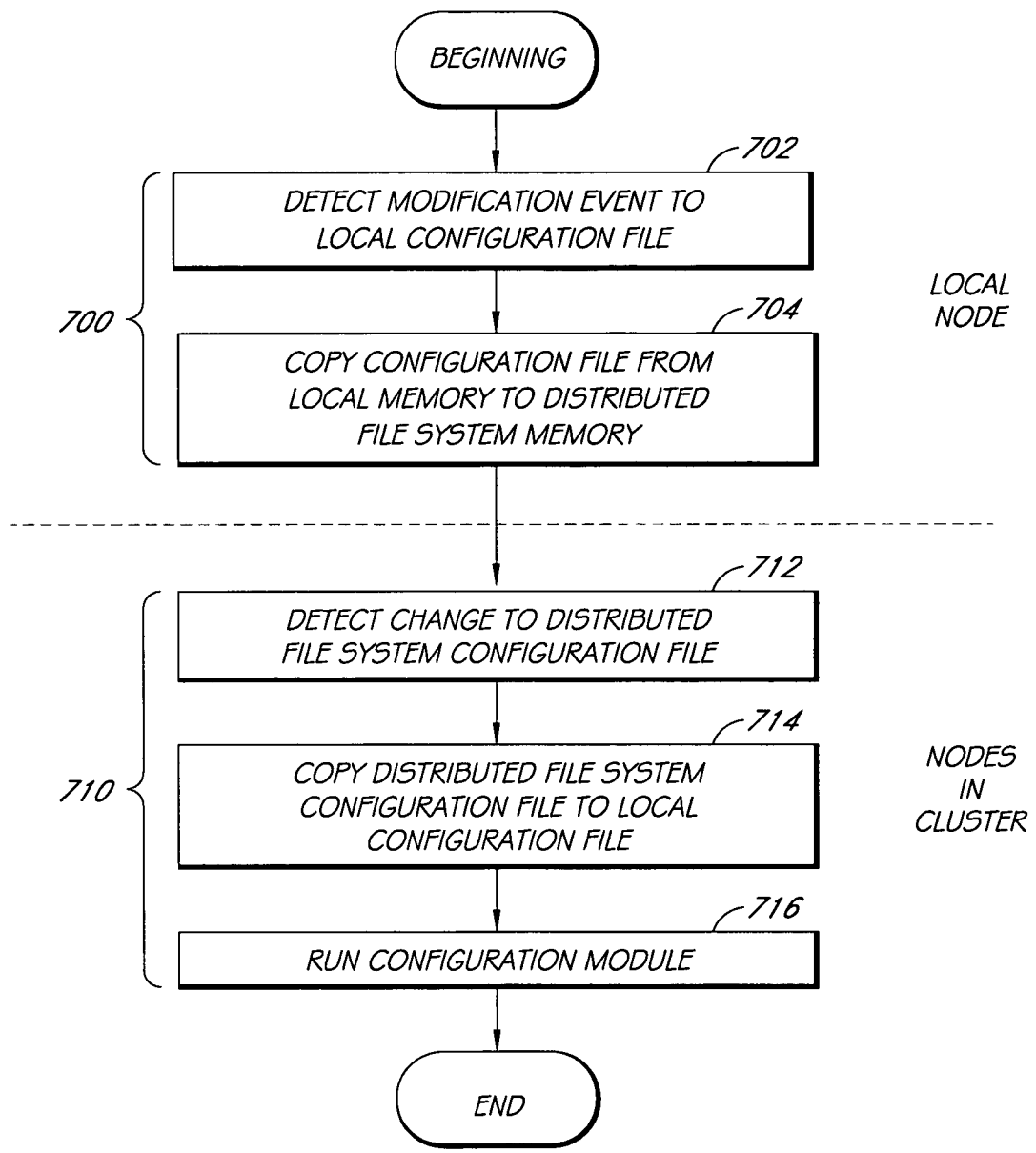
FIGS. 7A and 7B illustrate a flow chart of one embodiment of operations to automate the configuration of multiple network interfaces based on an exemplary network profile.
Figure 7B:
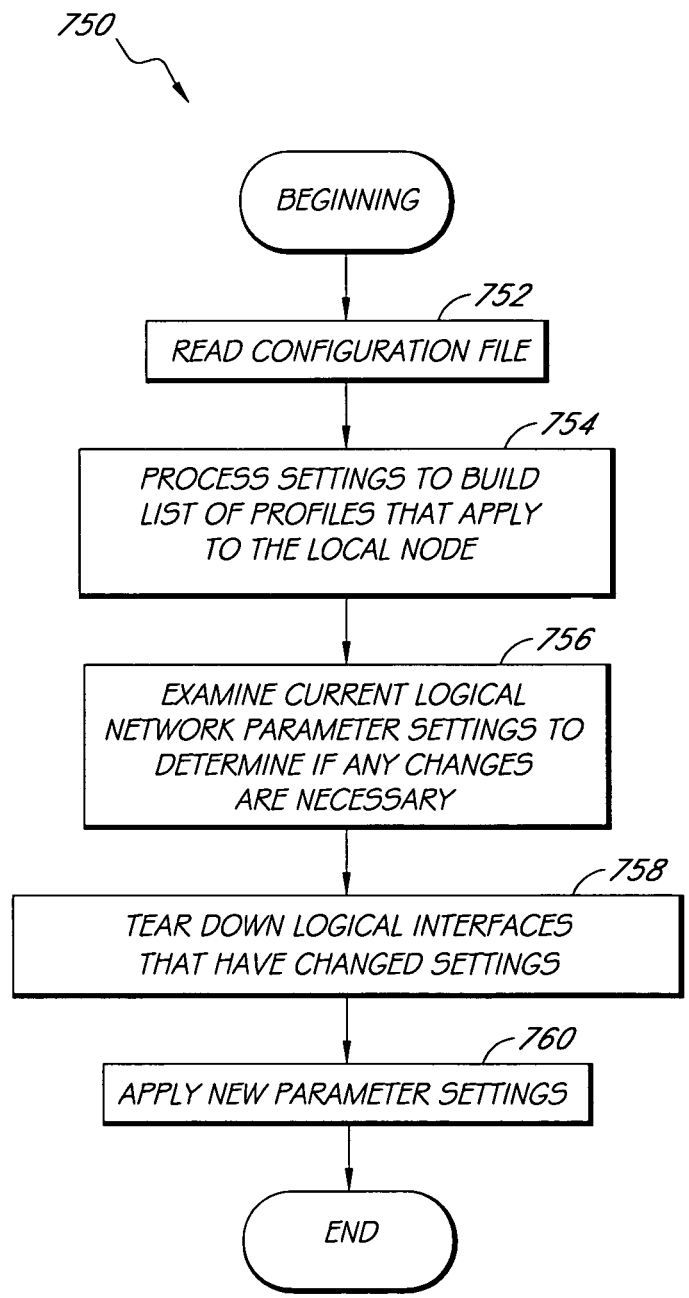

FIGS. 7A and 7B illustrate a flow chart of one embodiment of operations to automate the configuration of multiple network interfaces based on an exemplary network profile. FIG. 7A illustrates two exemplary background processes (or daemons) that may be used, in one embodiment, to initiate a configuration module after an administrator has made a change to a network profile. These background processes are, respectively, the copy-out process 700 and the copy-in process 710. This exemplary embodiment may be used, for example, with nodes 102 in the distributed system 100. In one embodiment, when a network administrator makes a change to a network profile and saves the modification to a configuration file, a modification event is triggered. In state 702, the copy-out process 700 detects a modification event signaling a change to the configuration file. After detecting the change to the local configuration file, the copy-out process 700 copies the local configuration file to a special directory on the distributed file network. Because the distributed file network may be stored on multiple nodes 102 of the distributed system 100, the distributed configuration file may be stored on multiple nodes 102 of the distributed system 100. Additionally and/or alternatively, multiple portions of the distributed configuration file may be stored on multiple nodes 102 of the distributed system 100. In state 706, the copy-out process 700 sends signals to the nodes 102 of the distributed system 100, including the node 102 upon which the copy-out process 700 is executing.

The copy-in process 710 operates on the nodes 102 of the distributed system 100. In state 712, the copy-in process 710 detects a change to the distributed configuration file. In state 714, the copy-in process 710 copies the distributed configuration file and saves the copy as the local configuration file on the node 102 upon which the respective copy-out process 710 is executing. In state 714, the respective copy-out process 710 runs the configuration module on the node upon which the respective copy-out process 710 is executing.

Although in the illustrated embodiment, the operations performed by the copy-out process 700 and the copy-in process 710 are divided between two background processes, in other embodiments the operations may be executed by a single background process or by multiple processes and/or may run in serial or in parallel. Moreover, other embodiments may implement the same operations without the use of background processes, executing the operations as part of the instructions of other modules, such as a user interface module for creating network profiles.

FIG. 7B illustrates exemplary operations for executing a configuration module to read a configuration file and configure multiple network interfaces based on the network profiles stored in the configuration file. In state 752, the configuration module reads the configuration file from the local directory. In state 754, the configuration module 750 processes the settings found in the configuration file to build a list of profiles that apply to the node 102 upon which the configuration module is executing. In state 756, the configuration module examines the current logical network parameters to determine if any changes are necessary. For example, the configuration module 750 may compare the network interface parameters specified for its external interfaces with the network interface parameters specified in the profiles corresponding to those interfaces. In state 758, the configuration module tears down any logical interfaces whose parameters do not match the parameters specified in the network profiles derived from the configuration file. In state 760, the configuration module

750 then applies the new interface parameters to build the logical interfaces based on the interface parameters of the profiles derived from the configuration file.

The following is one embodiment of an exemplary configuration file:

```xml
<?xml version="1.0" encoding="utf-8" ?>
<flexNet version="0">
    <dns-domain>company.com</dns-domain>
    <default-profile node-class="0">
        <profname interface="External-2">ext-IT</profname>
    </default-profile>
    <maxknownid>10</maxknownid>
<profiles>
    <profile>
        <name>ext-IT</name>
        <description>External Interface for IT</description>
        <gateway>10.6.0.1</gateway>
        <dns-primary>10.8.0.3</dns-primary>
        <netmask>255.255.0.0</netmask>
        <mtu>1500</mtu>
        <ipranges>
            <iprange>
                <low>10.6.10.50</low>
                <high>10.6.10.59</high>
            </iprange>
        </ipranges>
        <members>
            <interface>
                <lniname>External-2</lniname>
                <nodes>
                    <node>
                        <deviceid>1</deviceid>
                        <ipaddr>10.6.10.50</ipaddr>
                    </node>
                    <node>
                        <deviceid>2</deviceid>
                        <ipaddr>10.6.10.51</ipaddr>
                    </node>
                    <node>
                        <deviceid>3</deviceid>
                        <ipaddr>10.6.10.52</ipaddr>
                    </node>
                    <node>
                        <deviceid>4</deviceid>
                        <ipaddr>10.6.10.53</ipaddr>
                    </node>
                    <node>
                        <deviceid>5</deviceid>
                        <ipaddr>10.6.10.54</ipaddr>
                    </node>
                    <node>
                        <deviceid>6</deviceid>
                        <ipaddr>10.6.10.55</ipaddr>
                    </node>
                    <node>
                        <deviceid>7</deviceid>
                        <ipaddr>10.6.10.56</ipaddr>
                    </node>
                    <node>
                        <deviceid>8</deviceid>
                        <ipaddr>10.6.10.57</ipaddr>
                    </node>
                    <node>
                        <deviceid>9</deviceid>
                        <ipaddr>10.6.10.58</ipaddr>
                    </node>
                    <node>
                        <deviceid>10</deviceid>
                        <ipaddr>10.6.10.59</ipaddr>
                    </node>
                </nodes>
            </interface>
        </members>
    </profile>
    <profile>
        <name>ext-HR</name>
        <description>External Interface for Human Resources</description>
        <gateway>10.5.0.1</gateway>
        <dns-primary>10.8.0.3</dns-primary>
        <netmask>255.255.0.0</netmask>
        <mtu>1500</mtu>
        <ipranges>
            <iprange>
                <low>10.5.5.55</low>
                <high>10.5.5.60</high>
            </iprange>
        </ipranges>
        <members>
            <interface>
                <lniname>External-1</lniname>
                <nodes>
                    <node>
                        <deviceid>1</deviceid>
                        <ipaddr>10.5.5.55</ipaddr>
                    </node>
                    <node>
                        <deviceid>2</deviceid>
                        <ipaddr>10.5.5.56</ipaddr>
                    </node>
                    <node>
                        <deviceid>3</deviceid>
                        <ipaddr>10.5.5.57</ipaddr>
                    </node>
                    <node>
                        <deviceid>4</deviceid>
                        <ipaddr>10.5.5.58</ipaddr>
                    </node>
                </nodes>
            </interface>
        </members>
    </profile>
    <profile>
        <name>ext-LEGAL</name>
        <description>External Interface for LEGAL</description>
        <gateway>10.7.0.1</gateway>
        <dns-primary>10.8.0.3</dns-primary>
        <netmask>255.255.0.0</netmask>
        <mtu>1500</mtu>
        <ipranges>
            <iprange>
                <low>10.7.6.55</low>
                <high>10.7.6.60</high>
            </iprange>
        </ipranges>
        <members>
            <interface>
                <lniname>External-1</lniname>
                <nodes>
                    <node>
                        <deviceid>5</deviceid>
                        <ipaddr>10.7.6.55</ipaddr>
                    </node>
                    <node>
                        <deviceid>6</deviceid>
                        <ipaddr>10.7.6.56</ipaddr>
                    </node>
                    <node>
                        <deviceid>7</deviceid>
                        <ipaddr>10.7.6.57</ipaddr>
                    </node>
                    <node>
                        <deviceid>8</deviceid>
                        <ipaddr>10.7.6.58</ipaddr>
                    </node>
                    <node>
                        <deviceid>9</deviceid>
                        <ipaddr>10.7.6.59</ipaddr>
                    </node>
                    <node>
                        <deviceid>10</deviceid>
                        <ipaddr>10.7.6.60</ipaddr>
                    </node>
                </nodes>
            </interface>
        </members>
    </profile>
```

```
</profiles>
</flexNet>
```

In some embodiments, network profiles may specify interface application criteria. These criteria may specify certain conditions or characteristics that cause a particular interface to be added (or removed) from a particular profile. These criteria may specify characteristics of the interface, such as node type, logical interface type, and physical interface type; may specify conditions relevant to the network, such as static or dynamic load conditions and physical network type; may specify characteristics of the interface in relation to the interface, such as physical location; and/or many other suitable conditions and/or characteristics that may be used as criteria for determining whether to add and/or remove a node (or an interface of a node) from a network profile. It will be appreciated by one skilled in the art that there are many suitable criteria that may be used to determine automatic inclusion/exclusion of a node (or an interface of a node). The respective criterion may be evaluated when a node is added to a cluster, or at other suitable moments, such as when a cluster exceeds some maximum load or capacity.

In some embodiments, for example, network profiles specify instructions to automatically configure new nodes added to the cluster based on a set of rules that are applied based on certain aspects of new nodes. Examples of such rules are: (1) apply a given profile to all new nodes; (2) apply a given profile to all new accelerator nodes; and (3) apply a given profile to all new storage nodes. Thus, when a new node is added to the cluster, a configuration module processes the rules associated with each active profile, determines if the new node matches any of these rules, and then applies each matching profile's network settings to the node's physical network interfaces. In some embodiments, however, it is also possible for an administrator to edit a profile and manually select the list of nodes that the profile will apply to. Generally, the list includes nodes that are already a part of the cluster. In other embodiments, network profiles may specify automatic configuration rules for logical interface types and physical interface types as well. For example, a particular profile may apply automatically to specific logical interface types, such as "External 1," "External 2," "Internal A," "Internal B," and so forth, and/or to specific physical interface types, such as Gigabit Ethernet, 10 Gigabit Ethernet, Infiniband, and so forth.

In other embodiments, network profiles may also provide instructions for configuring new nodes based on other factors, including, but not limited to, dynamic load and physical network type. For example, a network profile may specify certain load characteristics, such as a maximum load, that dictate whether a new node added to the cluster should be automatically configured according to that profile. Additionally and/or alternatively, a network profile may specify a particular physical network type, adding a new node to the cluster only if it matches the specified type.

In still other embodiments, a network profile may specify parameters that cause a node to be reconfigured such that it is no longer a member of the profile. For example, a network profile may specify a maximum load. Upon exceeding the maximum load, a subset of the member nodes may be reconfigured such that they are no longer members of the profile. Such embodiments may require additional daemons (or additional responsibilities for existing daemons) to monitor network characteristics, such as network load.

V. Inactive Profiles and Migration of Network Addresses

Inactive profiles simplify a number of typically complicated network administration tasks as well as allow the administrator to plan ahead for the future cluster growth. One of the most common uses of inactive profiles is IP migration of a cluster. If the administrator needs to change the subnet on which the cluster is configured, a new profile may be created with the destination subnet information and the same node membership list as the old profile. When an administrator is ready to perform the actual move, they may disable the old profile (or mark it inactive) and enable the new profile. Once these two simple changes are saved, the configuration module may automatically tear down the old logical interfaces and configure new ones, so the migration may happen smoothly, with minimal down time.

Figure 8:
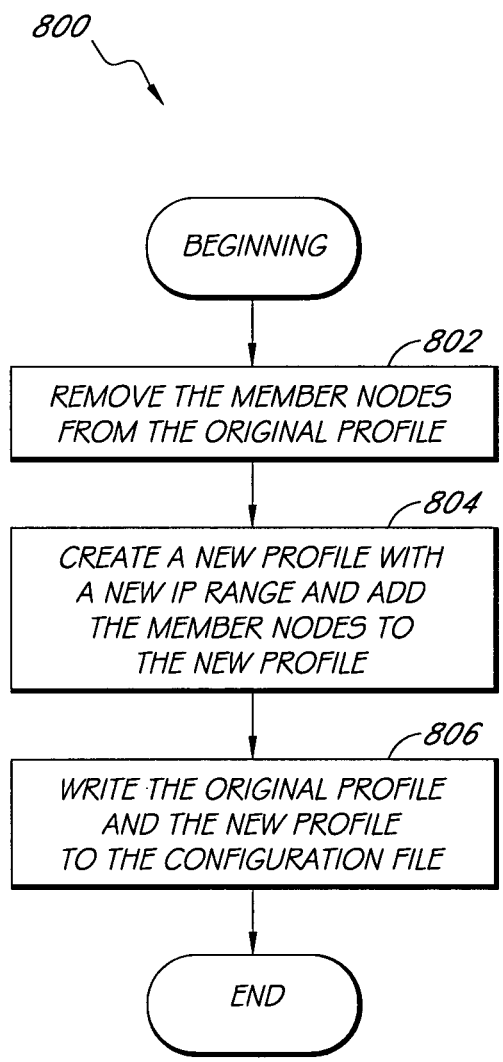
FIG. 8 illustrates a flow chart of one embodiment of operations to migrate network interfaces from old network addresses to new network addresses using exemplary network profiles.

FIG. 8 illustrates a flow chart of one embodiment of operations to migrate network interfaces from old network addresses to new network addresses using exemplary network profiles. The migration module 800 described herein may be performed either manually by a network administrator using a network profile management module, such as the user interface module described above with reference to FIGS. 4, 5, 6A, 6B, and 6C. Alternatively, the migration module 800 may be implemented automatically by a network profile management module that implements a high-level network address change, for example, with a migration dialog window. In the latter embodiment, the user may simply specify the change in network addresses without directly manipulating the membership of the respective network profiles, as described below.

In state 802, the migration module 800 removes the member nodes from the original profile. When a profile has no member nodes, the profile may be called "inactive." An inactive profile may be later written to the configuration file. In some embodiments, the configuration file may store multiple inactive profiles. When a configuration module, such as the configuration module 750, is executed to read the configuration file, the inactive profiles have no effect because they are not applied to any member nodes. In state 804, the migration module 800 creates a new profile with a new range of network addresses. Moreover, the new profile includes the member nodes of the original profile. Because the member nodes have been removed from the original profile, they are now available to be added to the new profile. Thus, the recently released member nodes are available to be added to the new profile. Thus, at the completion of state 804, there are two profiles—the original profile and the new profile. In the state 806, the migration module 800 writes the original profile and the new profile to the configuration file. In one embodiment, the configuration profile may be written after obtaining a lock, in order control access in case other processes try to modify the file at the same time.

FIGS. 9A and 9B illustrate exemplary network profiles corresponding to a sub-network whose network addresses have been migrated. The external network profiles 200 in FIGS. 9A and 9B have the same set of profile fields as the external network profiles 200 illustrated in FIGS. 2A, 2B, and 2C as described above. FIG. 9A illustrates the network profile 200 corresponding to the original external interface for human resources, which is named "ext-HR." FIG. 9B illustrates the new external interface for human resources, called "ext-HR_new." The profile fields are generally identical for the two profiles. The IP range field 210, however, is different, corresponding to the migration from the old IP addresses to the new IP address range. Moreover, the list of member nodes is different. The original profile is now inactive, containing no member nodes. On the other hand, the new profile lists the original member nodes previously belonging to the original profile. Thus, the external network profiles 200 illustrated in FIGS. 9A and 9B reflect one embodiment of a migration of network addresses.

Another use of inactive profiles is to temporarily disable external access to the cluster without having to manually configure every node in the cluster. To disable external access, the administrator may disable all the active profiles (mark them inactive). The configuration module may then automatically run on all nodes, tearing down the deactivated logical interfaces, preventing external traffic from reaching the cluster.

Inactive profiles also make other topology changes much easier, such as scaling an existing cluster as the organization scales. For example, if an organization begins to outgrow its initial storage cluster, it can easily purchase and add new nodes to increase capacity. Inactive profiles allow the organization to also plan and prepare a new network topology for the expanded organization. The administrator can create a number of new profiles, splitting cluster access into multiple departmental subnets. Once all the new nodes have been added, the administrator can disable the old profile and enable the set of new profiles, making the transition to a more mature network quickly and seamlessly.

VI. Exemplary Cluster of Heterogeneous Nodes

FIG. 10 illustrates a network cluster of heterogeneous nodes. The heterogeneous cluster 1000 includes two accelerator nodes 1002 and three storage nodes 1004. As illustrated, the nodes are configured into four separate sub-networks, "Int-A," "Int-B," "Ext-1," and "Ext-2." The logical, sub-networks are configured according to the physical connections via switches 106. The accelerator nodes handle communications from outside the sub-network. The storage nodes (S1, S2, and S3), on the other hand, are isolated from network traffic beyond the cluster.

Figures 11A, 11B:
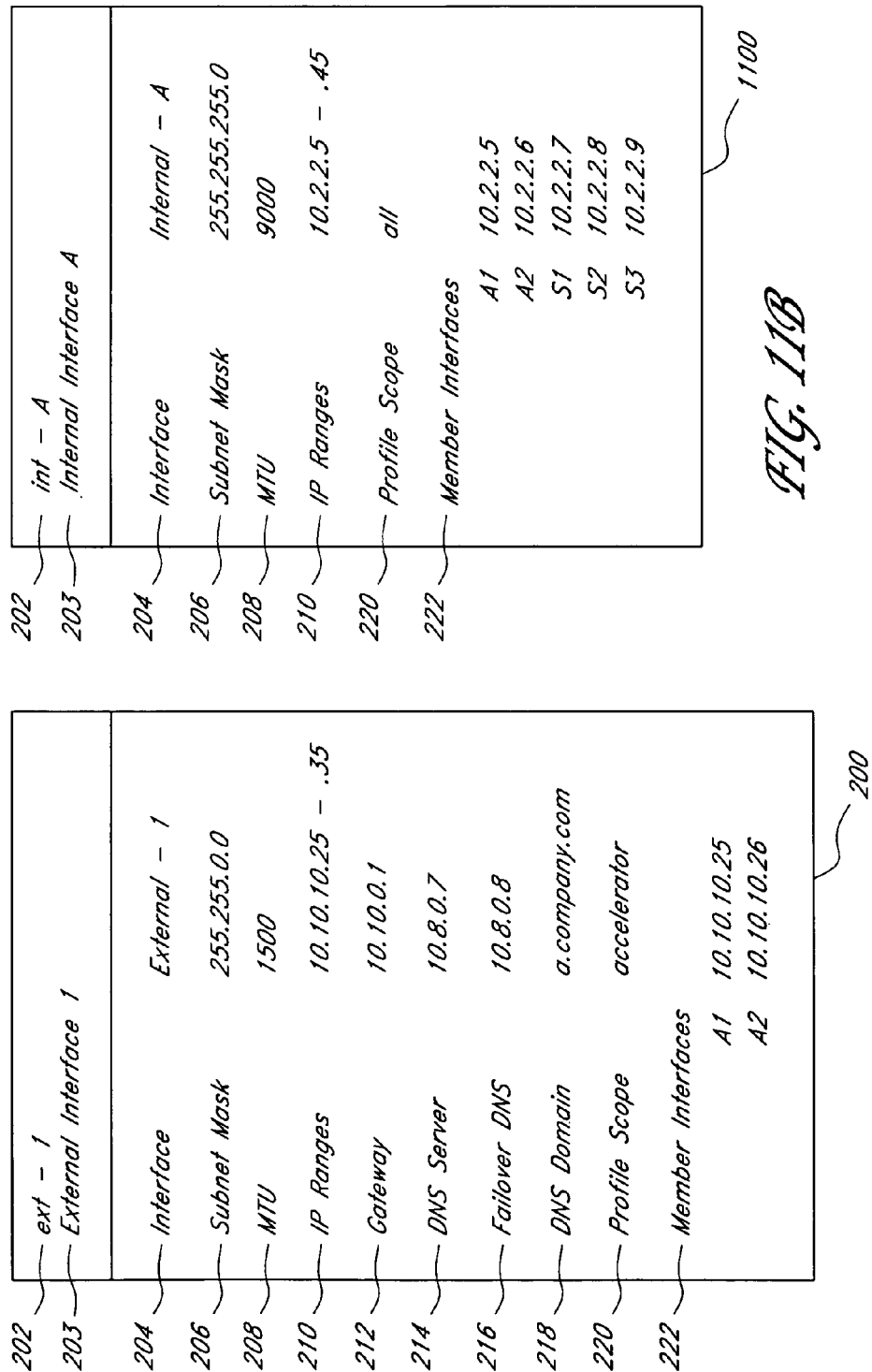
FIGS. 11A and 11B illustrate embodiments of network profiles for an external and internal sub-network, respectively, on an exemplary networked cluster of heterogeneous nodes.

FIGS. 11A and 11B illustrate exemplary embodiments of network profiles for an external and internal sub-network, respectively, on an exemplary networked cluster of heterogeneous nodes. FIG. 11A illustrates the external sub-network "External-1" as illustrated above with reference to FIG. 10. As illustrated in respective member nodes field 222, "Ext-1" has two member nodes corresponding to node A1 and node A2. The network profile "Ext-1" is connected via External 1.

FIG. 11B illustrates an internal network profile 1100 corresponding to the internal sub-network "Int-A." In the illustrated embodiment, the internal network profile 1100 specifies fewer profile fields than do the corresponding external network profiles 200. As illustrated, the internal network profile 1100 does not specify a gateway field 212, a DNS server field 214, a failover DNS server 216, or a DNS domain field 218. Because the internal network profile 1100 corresponds to an internal network shielded from external communication beyond the cluster 1000, the network profile 1100 does not specify the fields specific to external sub-networks. As illustrated, internal network profile 1100 has five member nodes (A1, A2, S1, S2, and S3).

VII. Additional Embodiments

While certain embodiments of the invention have been described, these embodiments have been presented by way of example only, and are not intended to limit the scope of the present invention. Accordingly, the breadth and scope of the present invention should be defined in accordance with the following claims and their equivalents.

What is claimed is:

1. A method of automatically configuring a plurality of network interfaces on a distributed system, the method comprising:

detecting, by a computer processor of at least one node of a plurality of nodes, a change to a distributed configuration file comprising a plurality of network profiles and stored on one or more of the plurality of nodes, each of the plurality of network profiles comprising interface parameters, the at least one node comprising a computer processor, local memory, a plurality of network ports, and two or more logical interfaces, each of the two or more logical interfaces associated with one of the plurality of network profiles and at least one of the network ports;

determining, by the computer processor of the at least one node, whether a change is necessary to one or more of the two or more logical interfaces of the at least one node based on the changed distributed configuration file; and if the computer processor of the at least one node determined that a change is necessary to one or more of the two or more logical interfaces of the at least one node, building, by the computer processor of the at least one node, at least one changed logical interface based on a network profile associated with the changed logical interface.

2. The method of claim 1, wherein the plurality of nodes comprise homogeneous nodes.

3. The method of claim 1, wherein the plurality of nodes comprise heterogeneous nodes.

4. The method of claim 1, wherein one or more of the plurality of network profiles comprise one or more criteria to determine membership of a node in a network profile, and the method further comprises determining whether the one or more of the plurality of network profiles apply to the at least one node based on the one or more criteria.

5. The method of claim 4, wherein the one or more criteria comprise one or more of the following characteristics: node type, interface type, network type, load conditions, and physical location.

6. The method of claim 1, further comprising:
receiving interface parameters for one or more of the plurality of network profiles; and
updating one or more of the plurality of network profiles in the distributed configuration file based on the received interface parameters.

7. The method of claim 6, wherein the updating one or more of the plurality of network profiles in the distributed configuration file comprises:
saving, by the computer processor of the at least one node, the received interface parameters to a local configuration file stored on the local memory of the at least one node; and
copying, by the computer processor of the at least one node, the local configuration file to the distributed configuration file.

8. The method of claim 6, wherein the detecting a change to the distributed configuration file comprises receiving a signal from one of the plurality of nodes.

9. The method of claim 1, wherein determining whether a change is necessary to one or more of the two or more logical interfaces of the at least one node based on the changed distributed configuration file comprises:
copying the distributed configuration file into a local configuration file on the local memory of the at least one node, the local configuration file comprising the plurality of network profiles; and
determining, by the computer processor of the at least one node, a subset of the plurality of network profiles which applies to the at least one node based on the plurality of network profiles in the local configuration file.

10. The method of claim 1, wherein each of a subset of two or more of the plurality of nodes further comprise a distributed memory and the distributed configuration file comprises multiple portions distributed among the distributed memories of the subset of the two or more of the plurality of nodes.

11. The method of claim 1, wherein a logical interface corresponds to a connection for a sub-network.

12. The method of claim 1, wherein a network profile identifies network characteristics of a corresponding sub-network.

13. A distributed system capable of configuring multiple network interfaces, the distributed system comprising:
   a plurality of nodes in communication with each other, each of the plurality of nodes comprising a computer processor, local memory, a plurality of network ports, two or more logical interfaces, and at least one executable software module, each of the two or more logical interfaces associated with one of a plurality of network profiles and at least one of the network ports;
   a distributed configuration file comprising the plurality of network profiles, the distributed configuration file stored on one or more of the plurality of nodes, each of the plurality of network profiles comprising interface parameters;
   wherein the at least one executable software module of each node of the plurality of nodes is configured, when executed by the computer processor of the node, to:
   detect a change to the distributed configuration file;
   determine whether a change is necessary to one or more of the two or more logical interfaces of the node based on the distributed configuration file; and
   if it is determined that a change is necessary to one or more of the two or more logical interfaces of the node, build at least one changed logical interface based on a network profile associated with the changed logical interface.

14. The distributed system of claim 13, wherein one or more of the plurality of network profiles comprise one or more criteria to determine membership of a node in a network profile, and the at least one executable software module of each node of the plurality of nodes is further configured to determine whether the one or more of the plurality of network profiles apply to the corresponding node based on the one or more criteria.

15. The distributed system of claim 14, wherein the one or more criteria comprise one or more of the following characteristics: node type, interface type, network type, load conditions, and physical location.

16. The distributed system of claim 13, further comprising a computer system comprising a computer processor and one or more input modules, the one or more input modules configured, when executed by the computer processor, to:
   receive interface parameters for one or more of the plurality of network profiles; and
   update one or more of the plurality of network profiles in the distributed configuration file based on the received interface parameters.

17. The distributed system of claim 16, wherein the computer system is one of the plurality of nodes and the one or more input modules are further configured to update one or more of the plurality of network profiles in the distributed configuration file by:
   saving the received interface parameters to a local configuration file stored on a local memory of the computer system;
   detecting a change to the local configuration file; and
   copying the local configuration file to the distributed configuration file.

18. The distributed system of claim 16, wherein the at least one executable software module of each node of the plurality of nodes is configured to detect a change to the distributed configuration file by receiving a signal from the one or more input modules.

19. The distributed system of claim 13, wherein the at least one executable software module of each node of the plurality of nodes is further configured to determine whether a change is necessary to one or more of the two or more logical interfaces of the node based on the distributed configuration file by:
   copying the distributed configuration file into a local configuration file on the local memory of the node, the local configuration file comprising the plurality of network profiles; and
   determining a subset of the plurality of network profiles which applies to the node based on the plurality of network profiles in the local configuration file.

20. The distributed system of claim 13, wherein each of a subset of two or more of the plurality of nodes further comprise a distributed memory and the distributed configuration file comprises multiple portions distributed among the distributed memories of the subset of the two or more of the plurality of nodes.

21. The distributed system of claim 13, wherein each of the plurality of network profiles comprise at least three interface parameters, one of the interface parameters comprising an identifier for each of a member subset of one or more of the plurality of nodes, the member subset comprising members of a network associated with the network profile, one of the interface parameters comprising an indication of an interface connection to be used by the member subset, and one of the interface parameters comprising a range of addresses available for logical interfaces associated with the member subset.

22. The method of claim 13, wherein a logical interface corresponds to a connection for a sub-network.

23. The method of claim 13, wherein a network profile identifies network characteristics of a corresponding sub-network.

* * * * *